(12) United States Patent
Liao et al.

(10) Patent No.: US 11,905,626 B2
(45) Date of Patent: Feb. 20, 2024

(54) EASILY SETTABLE STRETCH FABRICS INCLUDING LOW-MELT FIBER

(71) Applicant: THE LYCRA COMPANY LLC, Wilmington, DE (US)

(72) Inventors: Tianyi Liao, Chadds Ford, PA (US); Geoffrey D. Hietpas, Newark, DE (US); Brian Scott Alcott, Wilmington, DE (US)

( * ) Notice: Subject to any disclaimer, the term of this patent is extended or adjusted under 35 U.S.C. 154(b) by 750 days.

(21) Appl. No.: 15/538,768

(22) PCT Filed: Dec. 24, 2015

(86) PCT No.: PCT/US2015/000325
§ 371 (c)(1),
(2) Date: Jun. 22, 2017

(87) PCT Pub. No.: WO2016/105539
PCT Pub. Date: Jun. 30, 2016

(65) Prior Publication Data
US 2018/0002839 A1    Jan. 4, 2018

Related U.S. Application Data

(60) Provisional application No. 62/096,762, filed on Dec. 24, 2014, provisional application No. 62/198,243, filed on Jul. 29, 2015.

(51) Int. Cl.
*D02G 3/32*     (2006.01)
*D02J 1/08*     (2006.01)
(Continued)

(52) U.S. Cl.
CPC .............. *D02G 3/32* (2013.01); *A41B 9/001* (2013.01); *A41B 11/02* (2013.01); *A41C 1/003* (2013.01);
(Continued)

(58) Field of Classification Search
CPC . D02G 3/32; A41B 9/001; A41B 11/02; D02J 1/08
(Continued)

(56) References Cited

U.S. PATENT DOCUMENTS 5,916,829 A * 6/1999 Girard .................... A41D 31/02
                                                          450/156
6,140,042 A * 10/2000 Matsuomoto ...... C07K 14/4702
                                                          435/7.1
(Continued)

FOREIGN PATENT DOCUMENTS

CN    10145972 A1 * 12/2008
EP     0691427 A1    1/1996
(Continued)

OTHER PUBLICATIONS

International Search Report and Written Opinion Received for PCT Application No. PCT/US2015/000325, dated Apr. 22, 2016, 10 pages.
(Continued)

*Primary Examiner* — Alissa J Tompkins
*Assistant Examiner* — Catherine M Ferreira

(57) ABSTRACT

The present invention provides an easy settable stretch fabric comprising three types of yarns: a rigid fiber, an elastic fiber, and a low-melt fiber, wherein the low-melt fiber comprises low-melt polymer which can be fused in the temperature between 60° C. to 200° C., being higher than the temperature used for normal textile process and household laundry, but lower than the temperature used for heat setting elastic fiber. The low-melt fiber can be selected from a group of fibers made from modified polyester, nylon, and polypropylene and the copolymer from them in the form of staple or filament.

17 Claims, 5 Drawing Sheets

(51) Int. Cl.

| | | |
|---|---|---|
| *D06M 10/00* | (2006.01) | |
| *D04B 1/24* | (2006.01) | |
| *D04B 21/18* | (2006.01) | |
| *D04B 1/18* | (2006.01) | |
| *D04B 21/16* | (2006.01) | |
| *D04B 1/16* | (2006.01) | |
| *D04B 1/26* | (2006.01) | |
| *D03D 15/56* | (2021.01) | |
| *A41B 9/00* | (2006.01) | |
| *A41B 11/02* | (2006.01) | |
| *A41C 1/00* | (2006.01) | |
| *A41C 1/08* | (2006.01) | |
| *A41D 1/08* | (2018.01) | |
| *A41D 7/00* | (2006.01) | |
| *D03D 1/00* | (2006.01) | |
| *D04B 9/46* | (2006.01) | |
| *D04B 21/20* | (2006.01) | |
| *D06P 5/20* | (2006.01) | |
| *D01F 1/10* | (2006.01) | |

(52) U.S. Cl.
CPC .............. *A41C 1/08* (2013.01); *A41D 1/08* (2013.01); *A41D 7/00* (2013.01); *D02J 1/08* (2013.01); *D03D 1/00* (2013.01); *D03D 15/56* (2021.01); *D04B 1/16* (2013.01); *D04B 1/18* (2013.01); *D04B 1/243* (2013.01); *D04B 1/26* (2013.01); *D04B 9/46* (2013.01); *D04B 21/16* (2013.01); *D04B 21/18* (2013.01); *D04B 21/207* (2013.01); *D06M 10/00* (2013.01); *D06P 5/2066* (2013.01); *D06P 5/2072* (2013.01); *D06P 5/2077* (2013.01); *A41B 2500/10* (2013.01); *A41B 2500/20* (2013.01); *A41D 2500/10* (2013.01); *A41D 2500/20* (2013.01); *D01F 1/10* (2013.01); *D10B 2401/041* (2013.01); *Y02P 70/62* (2015.11)

(58) Field of Classification Search
USPC ........................................................ 450/95
See application file for complete search history.

(56) References Cited

U.S. PATENT DOCUMENTS

| | | |
|---|---|---|
| 7,341,500 B2 | 3/2008 | Horn et al. |
| 7,945,970 B2 | 5/2011 | Belluye et al. |
| 7,950,069 B2 | 5/2011 | Lee |
| 2005/0039836 A1* | 2/2005 | Dugan .................... D04H 3/14 156/62.2 |
| 2006/0030229 A1 | 2/2006 | Fukuoka et al. |
| 2008/0032580 A1 | 2/2008 | Fukuoka et al. |
| 2009/0061164 A1 | 3/2009 | Pasbrig et al. |
| 2009/0191777 A1* | 7/2009 | Liao ..................... D03D 13/004 264/103 |
| 2010/0064409 A1 | 3/2010 | Buckley |
| 2011/0214216 A1 | 9/2011 | Zarabi |
| 2011/9250420 | 10/2011 | Kalde |
| 2011/0283435 A1 | 11/2011 | Smith et al. .................. 2/69 |
| 2013/0298458 A1 | 11/2013 | Spittle |
| 2013/0302574 A1* | 11/2013 | Liu ........................ C08G 18/12 2/48 |
| 2016/0251782 A1* | 9/2016 | Liao ....................... D04B 1/12 66/202 |
| 2017/0172219 A1* | 6/2017 | Liao ........................ A41D 1/06 |
| 2018/0002839 A1* | 1/2018 | Liao ...................... D06P 5/2066 |

FOREIGN PATENT DOCUMENTS

| | | |
|---|---|---|
| EP | 0519135 B1 | 11/1996 |
| EP | 2261405 A2 | 12/2010 |
| GB | 2477754 A | 8/2011 |
| JP | H05-186924 | 8/2000 |
| JP | 2002-13044 | 1/2002 |
| JP | 2012-12733 | 1/2012 |
| JP | 2013-227692 A | 11/2013 |
| KR | 10-2012-0078493 A | 7/2012 |
| KR | 10-1437782 B1 | 9/2014 |
| WO | 03/092417 | 11/2003 |
| WO | 2009/125438 A1 | 10/2009 |
| WO | 2019/104531 A1 | 9/2010 |
| WO | 2011/011021 A1 | 1/2011 |
| WO | 2013/154445 A1 | 10/2013 |
| WO | 2014/194070 A1 | 12/2014 |
| WO | 2016/105539 A1 | 6/2016 |
| WO | WO-2016105539 A1 * | 6/2016 ............. A41B 11/02 |

OTHER PUBLICATIONS

International Preliminary Report on Patentability Report Received for PCT Patent Application No. PCT/US201 5/000325, dated Jun. 27, 2017, 7 pages.

Extended European Search Report in EP15873809.6 dated Jun. 14, 2018.

Search Report in Brazilian Patent Application No. BR112017013654-6 dated Dec. 30, 2019.

Office Action in Japanese Patent Application No. 2017-533752 dated Nov. 19, 2019 with English Language Summary Foreign Patent Documents.

* cited by examiner

EASILY SETTABLE STRETCH FABRICS INCLUDING LOW-MELT FIBER

CROSS-REFERENCE TO RELATED APPLICATIONS

This application claims the benefit of U.S. Provisional application Ser. No. 62/096,762, filed Dec. 24, 2014; and U.S. Provisional application Ser. No. 62/198,243, filed Jul. 29, 2015, the disclosures of which are specifically incorporated herein by reference in their entireties.

FIELD OF INVENTION

The present invention relates an easy-settable stretch fabric comprising a first type 1 of rigid fiber, a second type 2 of elastic fiber, and a third type yarn 3 of low-melt fiber, wherein, the low-melt fiber comprises low-melt polymer which can be fused at lower temperature than heatset temperature of elastic fiber. Without damaging the elastic fiber recovery power, the fabric can be stabilized with low shrinkage at low temperature. The fabric stretch level could be adjusted through the thermal activating process. The fabrics within the garment could have altering stretch levels in the predetermined locations, which offer the shaping and slimming features. The fabrics also have low shrinkage, good anti-elastane slippage and anti-laddering and anti-curling performance. Methods of making the fabrics and garments are also included.

BACKGROUND OF THE INVENTION

Elastic fiber and elastic fiber-containing fabrics and garments are typically heat-set to provide the fiber or fabric with good dimensional stability and to shape the finished garment. In order to have a good dimensional stability, some of the elastic fiber power is killed and the fiber properties are damaged. If heat setting is not used to "set" the elastic fiber, or the heatset temperature is too low, the fabric may have high shrinkage, excessive fabric weight, and excessive elongation, which may result in a negative experience for the consumer. Excessive shrinkage during the fabric finish process may result in crease marks on the fabric surface during processing and household washing. Creases that develop in this manner are frequently very difficult to remove by ironing.

Heat setting, however, has disadvantages. Heat setting at high temperature could damage the elastic fibers structure and kill its elasticity and recovery power, which often cause poor garment shape retention during wearing. Moreover, typical elastic fiber heat-setting temperatures can adversely affect sensitive companion yarns, e.g., wool, cotton, polypropylene and silk. After such heatset, the fabrics become harsh and sometimes yellowing. For polyester and Nylon fibers, high temperature heatset could affect the fabric dye ability. The industries look for the easier ways to control the fabric shrinkage while keeping the recovery power of elastic fiber and preserving the rigid fiber properties.

For woven, circular knit and warp knit fabric containing elastic fibers, repeatedly stretching, scratching or cutting often cause problems of laddering, running and curling. These problems include a ladder-like crack and a gap may be generated, elastic fibers may slip out, grin, fray at cut edges and fabric curls may result, which damages the uniformity and appearance of articles. During cutting and sewing process, the phenomenon that elastic fibers pull away from seams under repeated extension easily takes place and leads to the loss in stretch of fabrics, which is so called "slip in" or seam slippage. It becomes one of the key quality complaints from consumers and one of main reasons for garments return in department stores and brands.

Shaping garment is designed to temporarily alter the wearers' body shape to achieve a more fashionable figure. In recent years, fashion trends have tended to embrace clothing and apparel designs that increasingly accentuate natural curves of the human body, and the shape wear has been a growing trend in the market. The primary application has been in women's apparel, such as inner wear, lingerie, jeans and woven pants. Many women consumers look for comfortable garment that enhance her shape while highlighting her best features, for example, a shaping jean that can slim the tummy, tight the thigh and lift the buttock. The garment improves the appearance and self-esteem of wearer.

The current technical for shaping is mainly to use different yarn loop structure with long float stitch, higher denier or high draft of elastic fiber; or to apply a special silhouette pattern in strategically selected areas. Other common practice includes introducing second layers of fabric or pad sewn with base fabric, or selecting the fabrics with different elasticity and sewing together in different positions (Sun W., US79500669B2; Costa, F., WO2013/154445A1; James S., US2010/0064409A1; Frank Z., US2011/0214216A1; Stewart M., GB2477754A; Lori H., U.S. Pat. No. 7,341,500B2; Nicolas B., U.S. Pat. No. 7,945,970B2; Fujimoto M., EP 0519135B1). For example, a special designed rigid panel is added inside of jean in front of belly to help slenderize the stomach. A piece of pads or sponges is inserted into trousers to lift and enhance a visual buttock profile of the wear. All these methods compromise the wearers' comfort for offering the shaping effect and they are visible from the garment surface.

Low melting fibers have been widely used in nonwoven and other applications. Main purposes are for binding the fiber together to form web, and improving the fabric strength, abrasion and other performance. (Chang, H. S., EP2261405A, the use of low melting fiber in rigid woven for no apparel; Harold, K., US2009053763, bi-component fiber with low melting fiber in nonwoven shoe insole; Horiuchi, s., EP 0691427A1, Nonwoven with hot-melt-adhesive conjugate fibers; Kevin, S., US 20130298458, Fiber mulch mats bound with bi-component fiber).

Considerable efforts have been dedicated to develop thermal fusible and steam-settable polyurethane urea or polyurethane elastomeric fiber, such as in US 2009/061164, US 20060030229A1, US 200800322580A1. In these developments, the fusible component is spun with elastic component in single yarn. The fusion or melting of the fusible component mainly provides adhesive function with limited holding, restricting and shaping performance. The fabric stretch level is also unable to be changed and controlled.

The garment with easy-set, good recover, invisible shaping function and good anti-slippage and anti-laddering performance is still highly desirable.

SUMMARY OF THE INVENTION

The present invention provides an easy settable stretch fabric comprising three types of yarns: the rigid fiber, the elastic fiber, and the low-melt fiber, wherein, the low-melt fiber comprise low-melt polymer which can be fused in the temperature between 60° C. to 200° C., being higher than the temperature used for normal textile process and household laundry, but lower than the temperature used for heat setting elastic fiber. The low-melt fiber can be selected from a group of fibers made from modified polyester, nylon, and polyolefin and polypropylene and the copolymer from them in the form of staple or filament.

In accordance with the present disclosure, the low-melt polymer is partially or completely fused in a thermal activating process, and become stiffen and form cross linking with neighbor fibers, which helps in setting and fixing the yarn loop or crimp configuration within the fabric. The fabric structure is stabilized and the change of loop/crimp configuration and the relative movement of the yarns are restrained when the influence of external forces. The fabric has low shrinkage, good anti elastane slippage, anti-laddering and curving prevention properties.

In another aspect of the disclosure, the elastic fabric can be heatset at lower temperature than typical elastic fiber heatset temperature without damaging the elastic fiber recovery power. The stretch level of invented fabrics could be controlled by applying different heat in thermal activating process. Various fabric structures, including woven, circular knit, warp knit or hosiery and various garment constructions, e.g. active wear, sportswear, intimate apparel and ready to wear, such as jeans, can be made.

The present invention further provides a garment with localized shaping effect by applying thermal activating process in targeted areas on the garment. In the shaping areas, the fabrics have low stretch level, high extension modulus and higher holding force, which makes garment wearer's body figures more attractive in critical areas: such as in front of belly of the body, along the inner and outer sides of a thigh of a wearer, around knee region, around buttock area in the rear port of body.

The present invent finally provides the methods to make the composite yarn, the fabric and the garment with low-melt fiber, The low-melt fibers are added by a variety of methods including in fiber spinning, fiber blending, yarn covering, weaving or knitting processes. The thermal activating process could be conducted on fabric, garment panel, or whole garment during fabric finish, garment making, before or after garment laundry process.

DETAILED DESCRIPTION OF THE INVENTION

Fabrics according to the present invention are advantageously constructed with three types of yarns: rigid fiber, elastic fiber and low-melt fiber. As used herein, the term 'low-melt fiber', refers to a fiber comprises a low-melt polymer that has a melting temperature of greater than 60° C. but lower than 200° C., which ensures that low-melt fibers do not appreciably soften, melt or flow during the manufacture and household laundry of fabric and garments, but do soften or melt during the thermal activating process and act as a stabilizer and binder for stretch fabric.

Low-melt fiber has lower soften and melting temperature than regular textile fibers. The melting temperatures for regular textile fibers are mostly higher than 400° C., such as 482° C. to 550° C. for normal polyester, 482° C. for Nylon 66, 415° C. for Nylon 66 and 450° C. to 520° C. for spandex.

The low-melt fiber looks and behaves as regular rigid textile fibers with good flexibility and softness under normal textile and finishing processes. However, after thermal activating process, the low-melt fiber becomes stiffen, partially fused and adhered to the other neighbor fibers, including in elastic fiber, rigid fiber and other low-melt fibers. Such stiffen yarns and cross-linking structure restrict the relative movement of fiber inside fabric, lock and limit the fabric to be stretched out, diminish the fabric shrinkage and provide the shaping function.

The low-melt fiber can be selected from a group of fibers made from modified polyester, nylon, and polyolefin and polypropylene and the copolymers of these fibers in the form of staple or filament.

Figure 1:
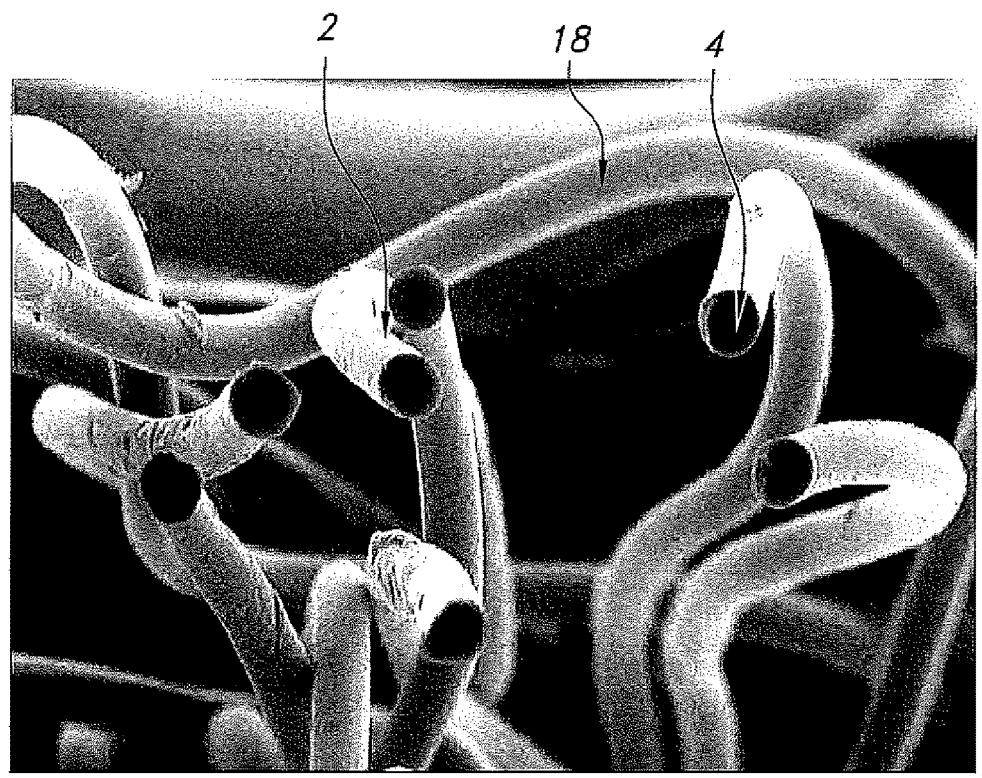
FIG. 1 is a photo of low-melt fiber in the state to start melting.

The term 'low-melt bi-component fiber" refers to a fiber which is manufactured with two components, having a first regular polymer component and a second low-melt polymer component. The low-melt polymer component is a modified polymer which can be fused in the range of 60° C. to 200° C. temperature, the temperature lower than one used for heat setting elastic fiber. FIG. 1 show a low-melt bi-component fiber 2 structure with first component 4 comprising regular polymer, and second component 6 comprising a low-melt component.

Figure 2:
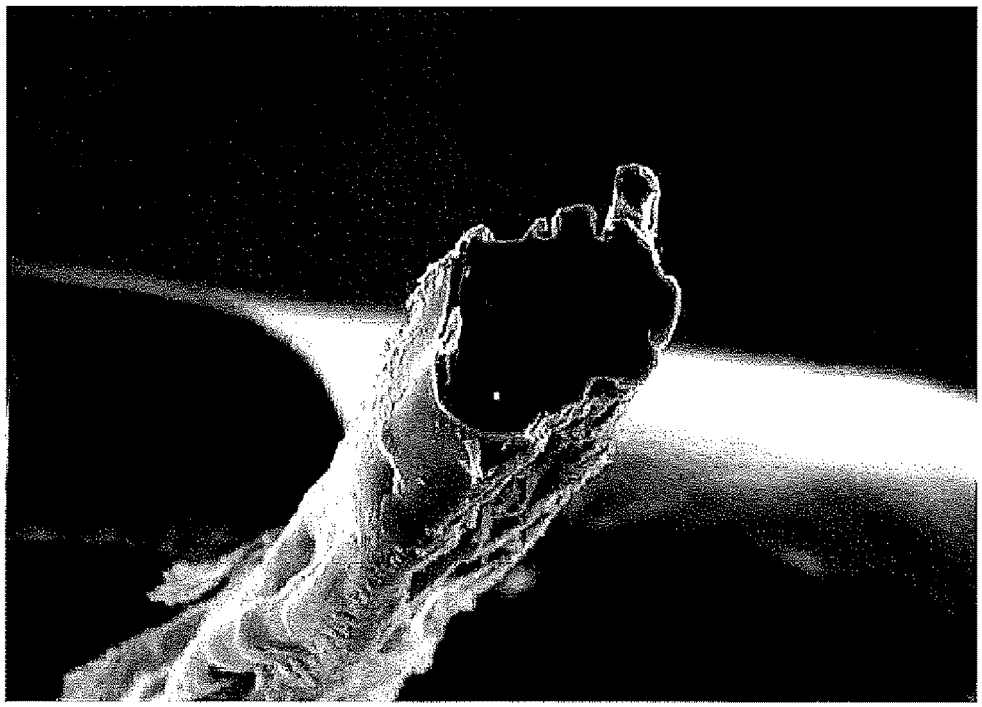
FIG. 2 is a photo of low-melt fiber in melt state.

As used herein, the term "thermal activating process' refers to the process that active the low-melt fiber stiffen and adhesive function by heat. During thermal activating process, the fabric is heat up to a certain degree, in which the heat is sufficient to soften or melt the low-melt polymer. Low-melt polymer adhere neigh fibers together (as shown in FIG. 2) and work as binding material to lock or restrain the relative movement of the fiber. However, the temperature is not high enough causing permanent structural impairment of normal rigid fiber and recovery power damage of elastic fiber.

As used herein, the term "rigid fiber" refers to a yarn which is substantially non-elastic, such as polyester, cotton, nylon, rayon, or wool.

Elastomeric fibers are commonly used to provide stretch and elastic recovery in fabrics and garments. "Elastomeric fibers" are either a continuous filament (optionally a coalesced multifilament) or a plurality of filaments, free of diluents, which have a break elongation in excess of 100% independent of any crimp. An elastomeric fiber when (1) stretched to twice its length; (2) held for one minute; and (3) released, retracts to less than 1.5 times its original length within one minute of being released. As used in the text of this specification, "elastomeric fibers" means at least one elastomeric fiber or filament. Such elastomeric fibers include but are not limited to rubber filament, biconstituent filament (which may be based on rubber, polyurethane, etc.), lastol, and spandex.

"Spandex" is a manufactured filament in which the filament-forming substance is a long chain synthetic polymer comprised of at least 85% by weight of segmented polyurethane.

"Elastoester" is a manufactured filament in which the fiber forming substance is a long chain synthetic polymer composed of at least 50% by weight of aliphatic polyether and at least 35% by weight of polyester. Although not elastomeric, elastoester may be included in some fabrics herein.

"Polyester bi-component filament" means a continuous filament comprising a pair of polyesters intimately adhered to each other along the length of the fiber, so that the fiber cross section is for example a side-by-side, eccentric sheath-core or other suitable cross-section from which useful crimp can be developed. The polyester bicomponent filament comprises poly(trimethylene terephthalate) and at least one polymer selected from the group consisting of poly(ethylene terephthalate), poly(trimethylene terephthalate), and poly(tetramethylene terephthalate) or a combination of such members, having an after heat-set crimp contraction value of from about 10% to about 80%.

The term "elastic fiber" refers to the fiber that can provide elasticity and recovery for stretch fabric. It comprises "elastomeric fiber", "elastoester fiber", spandex, "polyester bi-component filament" and others throughout the specification.

A "composite yarn" is one comprising both elastic fiber and low-melt fiber surrounded by, twisted with, or intermingled with rigid fiber. The rigid fiber serves to protect the elastic fibers from abrasion during textile processes. Such abrasion can result in breaks in the elastic fiber with consequential process interruptions and undesired fabric non-uniformities. Further, the covering helps to stabilize the elastic fiber elastic behavior, so that the elongation of composite yarn can be more uniformly controlled during textile processes than would be possible with bare elastic fibers. The composite yarn also can increase the tensile modulus of the yarn and fabric, which is helpful to improve the fabric recovery power and dimensional stabilities.

The composite yarns include: (a) single wrapping of the elastic fibers with a rigid fiber; (b) double wrapping of the elastic fibers with a rigid fiber; (c) continuously covering (i.e., corespun or core-spinning) an elastic fiber with staple fibers, followed by twisting during winding; (d) intermingling and entangling elastic and rigid fibers with an air jet; and (e) twisting an elastic fibers and rigid fibers together.

As used herein, the term "fabric" refers to a knitted or woven material. The knitted fabric may be flat knit, circular knit, warp knit, narrow elastic, and lace. The woven fabric may be of any construction, for example sateen, twill, plain weave, oxford weave, basket weave, and narrow elastic and the like.

As used herein, "pick-and-pick" means a weaving method and a woven construction in which one weft yarn containing low-melt fiber and another weft yarn containing regular textile filament or staple fibers are woven in alternating picks.

"Co-insertion" means a weaving method and a woven construction in which the low-melt fiber and a regular spun staple or filament weft yarn are woven as one, in the same pick.

As used herein, the term "molded" article refers to a result by which the shape of an article or shaped article is changed in response to application of heat and/or pressure.

As used herein, the term "pressing" or "pressed" refers to an article that has been subjected to heat and/or pressure to provide a substantially planar structure.

We surprised find that the stretch fabric comprising low-melt fiber, can be set at lower temperature than heat-set temperatures for normal elastane fibers. Under preferred heat condition, the low-melt fiber partially or completely melt and fused with neighbor fibers. After cooled down into room temperature, the low-melt fibers become stiffen and form cross linking with neighbor fibers. The fused low-melt fibers hold and bind the elastic fiber together with rigid fiber together. The fabric dimensional stability get controlled without damaging the elastic fiber performance, including the elasticity and recovery. So the fabric has low grow, good recovery and excellent shape retention, while keeping in the low shrinkage. This is desirable for fabrics containing heat sensitive companion fiber, such as containing cotton, wool, polypropylene and silk. The low temperature is also beneficial for saving energy in fabric manufacture.

According to the invention, the sufficient temperature for thermal activating may be from about 60° C. to about 180° C. rather than the 185-195° C. range currently being used in many commercial elastic fabric production processes. The optimum temperature and processing time will depend upon the specific materials used in low-melt component.

We also found that the invention stretch fabric comprising low-melt fiber, can be made with various stretch level by using different thermal activating temperature, which is lower than heatset temperature of elastic fibers. The fusion rate of low-melt fiber and the setting efficiency of the innovative fabric depend on the heat amount used during thermal activating process. As the process temperature raises higher, more low-melt fiber melt and fused with neighbor fibers, the binding force among fibers become bigger and the elastic fiber is bound more firmly, which results in lower fabric stretch level.

In this way, by adjusting activating heat temperature and time, the fabric with different stretch level can be obtained. The thermal activation temperature could be adapted from 20° C. degree lower than fusing temperature to 5° C. higher temperature than fusing temperature.

Many types of elastic fabrics may be produced with low-melt fiber that include, but are not limited to, woven fabric, circular knit fabrics, warp knit fabrics, seamless fabrics, hosieries, such as panty hose, socks, thigh highs and knee thighs, among others.

The low-melt fiber can be added during yarn spinning process by blended and mixed with rigid fiber. The low-melt fiber also can be blended together with rigid fiber in roving form in sliver processing. It is also workable to feed low-melt fiber with rigid fiber and elastic fiber together in covering process of composite yarns, such as air covering, single covering, double covering and core spun yarn process. It is also can be added during weaving and knitting operation through co-insertion or plating way. Dyeing and finishing of the fabric or garment after assembly can be conducted.

Figure 3:
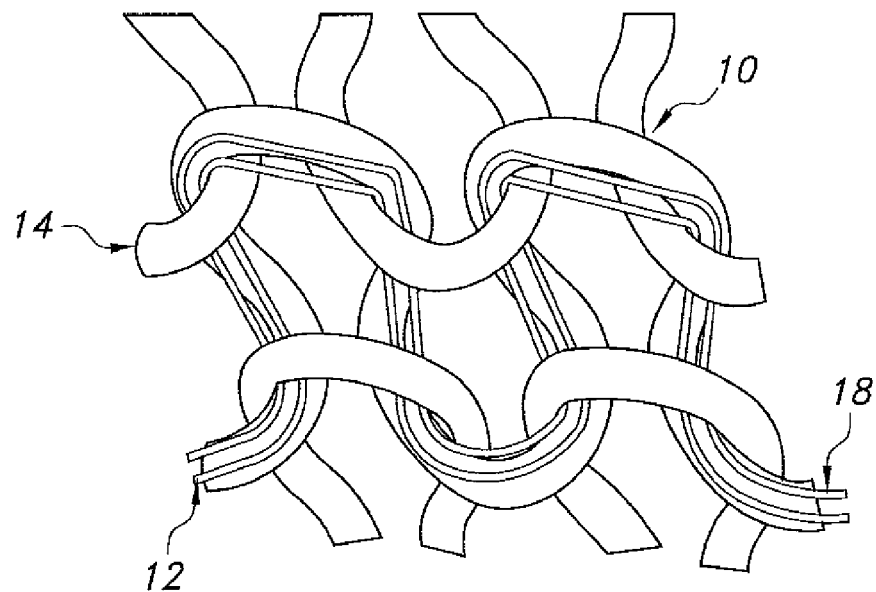
FIG. 3 is an illustrated of composite yarn core spun with elastic fiber and low melt fiber in the core.

In some embodiments are circular knit and warp knit fabrics. FIG. 3 shows the knit fabric structures with low-melt fiber. The low-melt fiber is plated with elastic fiber and rigid fiber to form stitch loop structure. After thermal activating process, the low-melt fibers are fused partially and bond some of the elastic and rigid fiber to together. That prevents slippage of the yarn and anti-laddering.

FIG. 3 is a schematic representation of plated knit stitches 10 wherein the knitted yarn comprises elastic fiber 12, low-melt fiber 18, a hard fiber 14. Elastic fibers 12 and low-melt fiber 18 are plated with hard fiber 14 to form a knit fabric 10. For jersey knit constructions in circular knit machines, the process of co-knitting elastic fiber is called "plating." With plating, the hard fiber 14, the low-melt fiber 18 and the elastic fiber 12 are knitted parallel, side-by-side relation, with the elastic fibers and low-melt fibers always kept on one side of the rigid fiber, and hence on one side of the knitted fabric.

Figure 4:
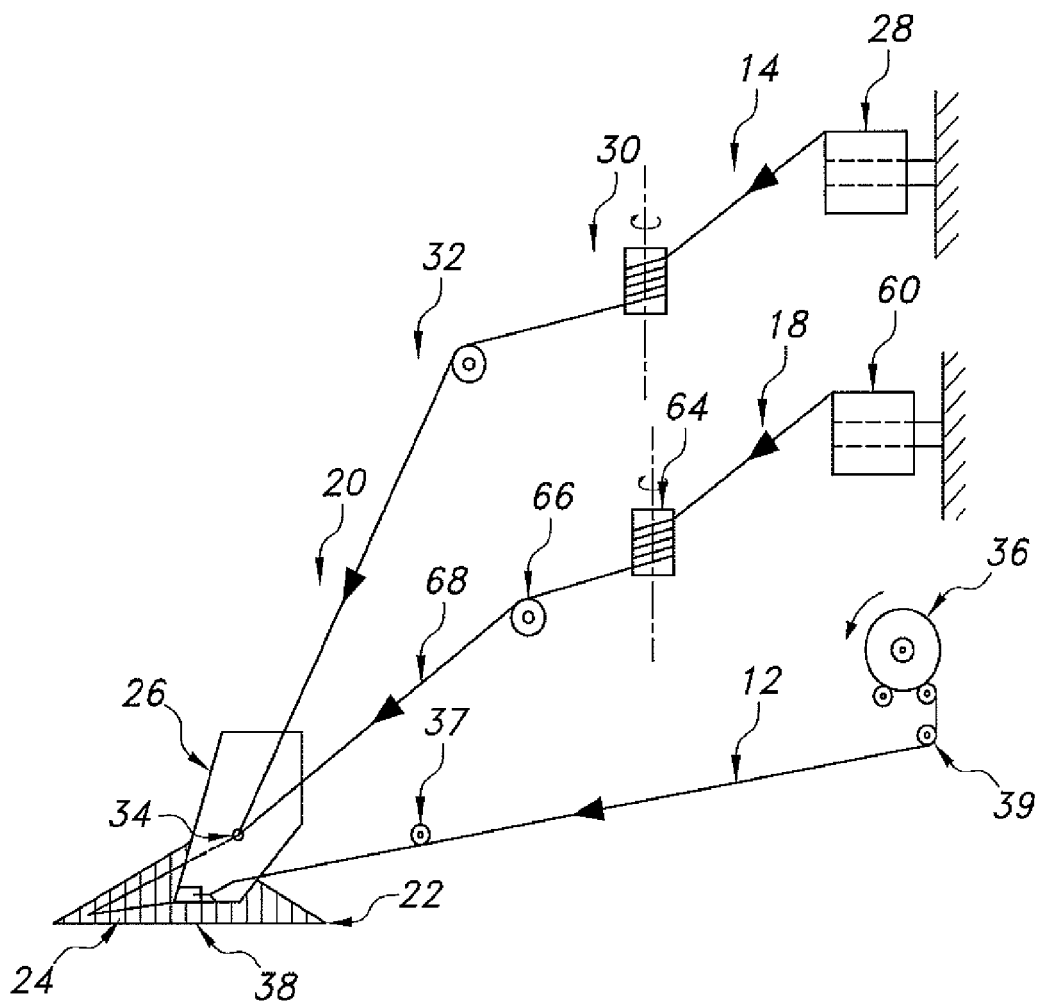
FIG. 4 is a schematic description of a core spinning apparatus with two draft devices (elastic fiber+low melt fiber).

FIG. 4 shows in schematic form one feed position 20 of a circular knitting machine having a series of knitting needles 22 that move reciprocally as indicated by the arrow 24 in response to a cam (not shown) below a rotating cylinder (not shown) that holds the needles. In a circular knitting machine, there are multiple numbers of these feed positions arranged in a circle, so as to feed individual knitting positions as the knitting needles, carried by the moving cylinder, are rotated past the positions.

The device shown in FIG. 4 could be used for producing knit fabrics with three fibers where elastic fiber, low-melt fiber and one rigid fiber have the same stitch patterns. Three yarns are knitted together in the same routes. Single jersey or twill knit structures can be made.

During plating knit operations, an elastic fiber 12, a low-melt fiber 18, and a hard fiber 14 are delivered to the knitting needles 22 by a carrier plate 26. The carrier plate 26 simultaneously directs all three yarns to the knitting position. The elastic fiber 12, low-melt fiber 18 and hard fiber 14 are introduced to the knitting needles 22 to form a single jersey knit stitch 10 like that shown in FIG. 3.

The rigid fiber 14 is delivered from a yarn package 28 to an accumulator 30 that meters the yarn to the carrier plate 26 and knitting needles 22. The rigid fiber 14 passes over a feed roll 32 and through a guide hole 34 in the carrier plate 26. Optionally, more than one rigid fiber may be delivered to the knitting needles via different guide holes in the carrier plate 26.

The low-melt fiber 18 is delivered from a yarn package 60 to an accumulator 64 that meters the yarn to the carrier plate 26 and knitting needles 22. The low-melt fiber 18 passes over a feed roll 66 and through a guide hole 34 in the carrier plate 26.

The elastic fiber 12 is delivered from a surface driven package 36 and past a broken end detector 39 and change of direction roll(s) 37 to a guide slot 38 within the carrier plate 26. The feed tension of the elastic fiber 12 is measured between the detector 39 and drive roll 37, or alternatively between the surface driven package 36 and roll 37 if the broken end detector is not used. The guide hole 34 and guide slot 38 are separated from one another in the carrier plate 26 so as to present the rigid fiber 14, low-melt fiber 18, and elastic 12 to the knitting needles 22 in side by side, generally parallel relation (plated). Commercially available elastane products for circular knitting are useful in the invention. Examples of commercially available brands include Lycra® (a registered trademark of Invista S. a r.l.) types 162, 169 and 562 (available from Invista S. a r.l.).

The elastic fiber stretches (drafts) when it is delivered from the supply package to the carrier plate and in turn to the knit stitch due to the difference between the stitch use rate and the feed rate from the elastomeric yarn supply package. The ratio of the rigid fiber supply rate (meters/min) to the elastic fiber supply rate is normally 2.5 to 4 times (2.5× to 4×) greater, and is known as the machine draft. This corresponds to elastic fiber elongation of 150% to 300%, or more. The feed tension in the elastic fiber is directly related to the draft of the elastic fiber. This feed tension is typically maintained at values consistent with high machine drafts for the elastic fiber. We found that improved results are obtained when the total elastomeric yarn draft, as measured in the fabric, is kept to about 5× or less, typically 3× or less, for example 2.5× or less. This draft value is the total draft of the elastic fiber, which includes any drafting or drawing of the elastic fiber that is included in the supply package of as-spun yarn. The value of residual draft from elastic fiber is termed package relaxation, "PR", and it typically ranges from 0.05 to 0.15 for the elastic fiber used in the circular knit, elastic, single jersey fabrics. The total draft of the elastic fiber in the fabric is therefore MD*(1+PR), where "MD" is the knitting machine draft. The knitting machine draft is the ratio of rigid fiber feed rate to elastic fiber feed rate, both from their respective supply packages. Because of its stress-strain properties, elastic fiber drafts more as the tension applied to the elastic fiber increases; conversely, the more that the elastic fiber is drafted, the higher the tension in the yarn. A typical elastic fiber path, in a circular knitting machine, is schematically shown in FIG. 4. The elastic fiber 12 is metered from the supply package 36, over or through a broken end detector 39, over one or more change-of-direction rolls 37, and then to the carrier plate 26, which guides the elastic fiber to the knitting needles 22 and into the stitch. There is a build-up of tension in the elastic fiber as it passes from the supply package and over each device or roller, due to frictional forces imparted by each device or roller that touches the elastic fiber. The total draft of the elastic fiber at the stitch is therefore related to the sum of the tensions throughout the elastic fiber path. The elastic fiber feed tension is measured between the broken end detector 39 and the roll 37 shown in FIG. 4. Alternatively, the elastic fiber feed tension is measured between the surface driven package 36 and roll 37 if the broken end detector 39 is not used. The higher this tension is set and controlled, the greater the elastic fiber draft will be in the fabric, and vice versa. For example, this feed tension can range from 2 to 4 cN for 22 dtex elastic fiber and from 4 to 6 cN for 44 dtex elastic fiber in commercial circular knitting machines. With these feed tension settings and the additional tensions imposed by subsequent yarn-path friction, the elastic fiber in commercial knitting machines will be drafted significantly more than 3×. Minimizing the spandex friction between the supply package and the knit stitch helps to keep the elastic fiber feed tensions sufficiently high for reliable elastic fiber feeding when the elastic fiber draft is 7× or less. For reliably feeding elastic fiber from the supply package to the knit stitch, the elastic fiber draft is typically 3× or less.

The low-melt fiber 18 is stretched (drafted) before it enters the knitting needle 22. The yarn is stretched out through the speed difference between an accumulator 64 and the carrier plate 26 and in turn to the knit stitch. The ratio of the feed rate from the stitch use rate to the accumulator 64 (meters/min) is normally 1.01× times to 1.35× times (1.01× to 1.35×). Adjusting the speed of accumulator 64 gives the desired draft or stretch ratio. Too low a stretch ratio will result in low quality fabrics having grin-through. Too high a stretch ratio will result in breakage of the low-melt fiber yarns.

In some embodiment, the warp knit fabrics include low-melt fiber. The first type of rigid filamentary yarn, such as polyester or polyamide, and a second type of elastic fiber 2 are interloped to form a plurality of locking nodes. The second types of the yarn forms a plurality of locking points with a third type of low-melt fiber 3. Through the fusing of yarn 3 during a thermal activation process, the fabric may be formed by knitting together the three types of yarn, the knitting process forming the inter-looking of first and second of yarn, and the third type of yarn may effectively be a weft insertion yarn not forming any loops. Subsequent thermal activating process to heat the fabric to 60° C.-200° C. degree centigrade, for 1-4 minutes, causes the second and third types of yarn to melt and adhere to each and possibility to other yarns.

During knitting process, the fabric is produced through consorted movement of all moving parts on the machine according to the loop forming method and predetermined stitch pattern. In the fabric thus produced, there are open ended loops, close-ended loops and weft insertion yarns for the continuous stitches.

Three types of yarns are arranged on the warp knit machine, such as Karl Mayer, or Liba warp machine. The type 1 of rigid fiber is arranged on the first yarn guide bar. Structure loops of the yarn are formed cooperatively via the vertical movement of the knitting needle and the horizontal movement of the yarn guide needle.

Similarly, the elastic fiber and low-melt fiber are respectively arranged on the second and third guide bars. The order of these two yarn are not strict important. The fabric is produced from three types of s via the requisite reciprocating motions of yarn guide needle and in accordance to the predetermined texture structure.

It is understood that the fabric produced according to the aforementioned method, can be made on different types of Raschel machines or Trico machines, as long as a fusible yarn with proper low-melt property is provided so that at a special temperature (60° C.~200° C.) in the process of heat treatment it adhere to each other and/or to other yarns to prevent sliding of loops. In this way the elastic fabric will have super anti-slippage properties.

In some embodiments is an article including a woven fabric having at least one low-melt fibers in warp or weft direction, by using composite yarn, such as core spun yarn, air covered yarn, single covered yarn or co-insertion weaving method.

Figure 5:
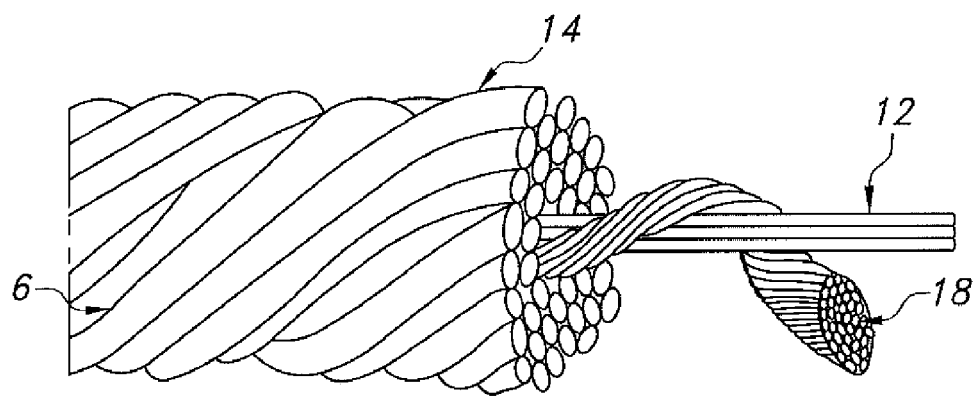
FIG. 5 is a schematic diagram of plated knit stitches comprising a hard fiber, elastic fiber and low-melt fiber.

FIG. 5 further explain the structure of core spun yarn 8 used in elastic woven. The yarn includes elastic fiber 12, rigid fiber 6 and low-melt fiber 18. The elastic fiber 12 and low-melt fiber 18 are located in the core while rigid fiber 6 is located in outside as a sheath. The elastic fiber 12 and low-melt fiber 18 are surrounded, preferably along the entirety of its length by a rigid fibrous sheath 10 comprised of spun staple fibers.

Figure 6:
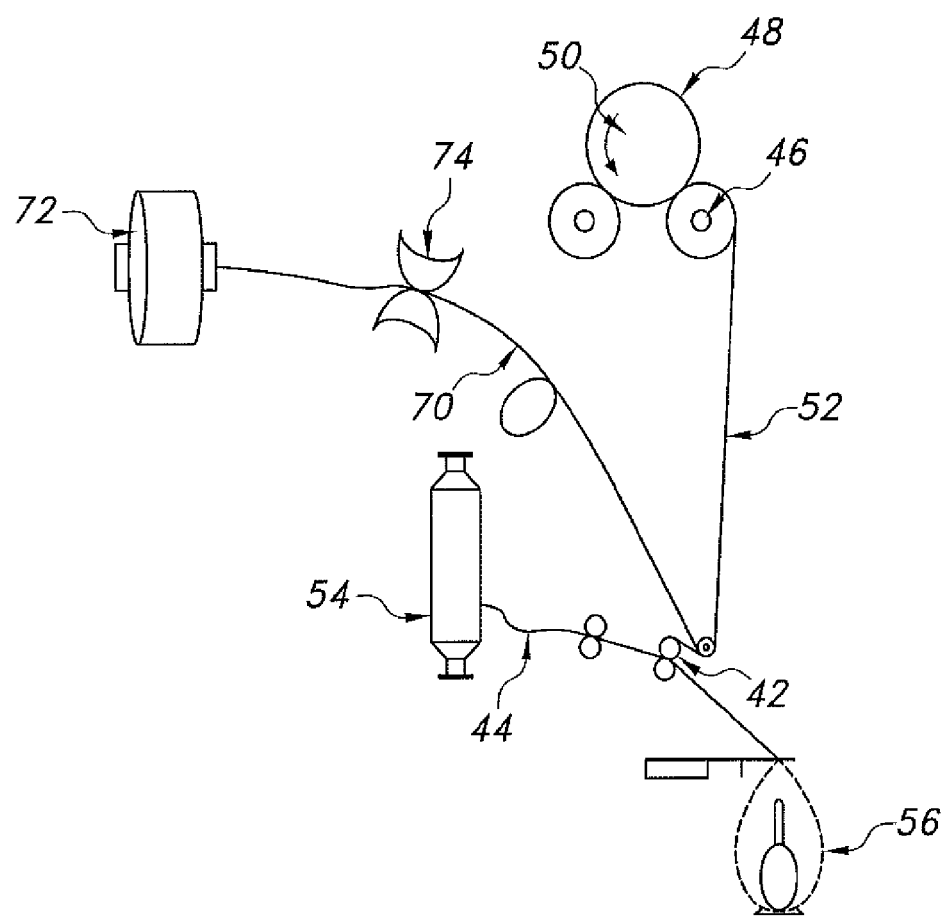
FIG. 6 is a schematic diagram of a portion of a circular knitting machine fed with a hard fiber feed, an elastic fiber feed, and a low-melt fiber feed.

One embodiment of a representative core spinning apparatus 40 is shown in FIG. 6. During core spinning processing, elastic filament 48 and low-melt fiber 70 are put on deliver roll 46 and 64 separately and are combined with a rigid fiber 44 to form a composite core spun yarn 56. Two separated core fiber feeding devices 46 and 64 are installed on the machine. Elastic fiber is bare elastic filaments 48, while low-melt fiber tube 72 is taken off from end and then passes through tension control device 74 and guide bar. The tension device 74 serves to keep the yarn tension stable at a pre-determined level.

The hard fiber or yarn 44 is unwound from tube 54 to meet the elastic fiber 52 and low-melt fiber 70 at the set of front rollers 42. The combined elastic fiber 52, fusible shaping 70 and hard fiber 44 are core spun together at spinning device 56.

The stretch ratio for elastic fiber is normally 1.01× times to 5.0× times (1.01× to 5.0×) compared to the un-stretched fiber. Too low a stretch ratio will result in low quality yarns having grin-through and an un-centered elastic filament. Too high a stretch ratio will result in breakage of the elastic filament and core void.

The stretch controllable woven fabrics also can be made by using air covered yarn. The low-melt fibers are mixed or blended together with elastic fiber and rigid filament, such as nylon or polyester fiber during air covering process. Three fibers are introduced together into interlacing nozzle and form interlaced points by pressure air. The interlaced yarn then is woven into fabrics to work as warp yarn or weft yarn.

The low-melt fiber is also could be inserted into fabric as an alternative structure or co-insertion structure. In alternation structure or "pick-and-pick" structure, a woven construction in which the low-melt fiber and a spun staple or filament weft yarn are woven in alternating picks. In "Co-insertion" weaving construction, the low-melt fiber and a spun staple or filament weft yarn are woven as one, in the same pick.

Figure 9:
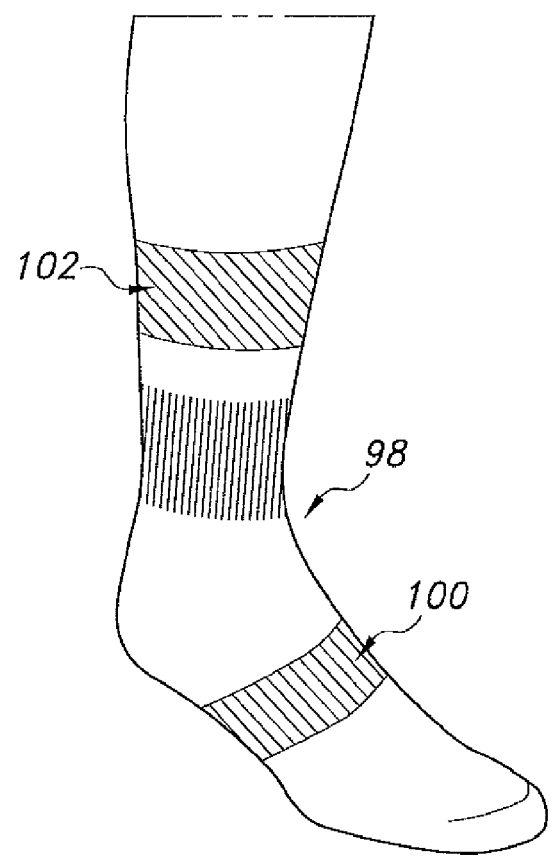
FIG. 9 is an illustrated a hosiery with fused shaping area in leg and foot portion.

In another embodiment is the article comprising hosiery with low-melt fiber. The low-melt fiber can be used in any portion on the hosiery, such as in top, body, leg or toe portions. The low-melt fiber is used in simple rigid form, or in composite yarn form, e.g. air-jet covered, single covered, double covered. It can be knitted in all course or alternate course form. The existing of low-melt fiber helps to prevent elastane fiber from running and laddering. The special shaping or holding effect could be achieved by applying or pressing high temperatures in predetermined area, where the fabric has lower stretch level and higher holding force to prevent slip during wear. In cooperating with high denier elastane fiber, medical hosiery with high compression in target areas can be made. FIG. 9 illustrates hosiery with high compression force in leg and foot area, where the low-melt fiber is melt by high temperature.

One example is the application in pantyhose. The low-melt fiber is able to be knitted into different portion of the pantyhose, including waistband, panty, leg and toe part. In waistband, the low-melt fiber increases the holding force to anchor the garment in place. In panty port, low-melt fiber enhances the holding force to hold up legs and shaping the body figure. It increases robust strength to with stand both rough handling while pulling into the wear position, sewing, and body movement. It is also provide shaping functions. In leg porting, low-melt fiber would not reduce the sheer styles, mostly in plain stitch as this delivers the maximum sheerness for a given denier and needle count. Various knit and tuck arrangements can be adopted to increase the garment durability without at the expense of touch, sheerness, stretch recovery and production speeds. In toes part, the low-melt fiber could increase the durability in this weak spot. Break down in the toe being one of the major causes of the garment failure. The low-melt fiber would affect aesthetic desirability and function needs.

In pantyhose knit machine, low-melt fiber can be placed at creel and fed in at any feeds and any yarn fingers, which enable the yarn to be introduced or taking out at any point in the knitting cycle. Most knitting machine have 4 feeds, each feed having several yarn fingers.

Another example is socks where low-melt fiber is knitted in rib top, leg portion, foot portion and toe portion. In sock tops, most common structure is double covered elastic composite yarn laid in alternate course. The spandex denier is between 100D to 140D. In sock bodies, air-jet covered yarn comprising low-melt fiber with spandex, optionally with other rigid fiber, such as textured polyester or Nylon, are plated together with rigid fiber. The spandex denier ranged from 10 denier to 40 denier.

The fabric of this invention has at least 1% by weight low-melt fiber that has a melting temperature above the temperature of the textile process and household laundry.

These low-melt fibers used in the fabrics of this invention act as a stabilizer and binder for the fabric and soften or melt during the thermal activating process, but do not appreciably soften, melt or flow during the manufacture of fabric and garments, particularly those manufacturing steps that require heat to finish and dye the fabrics. In some preferred embodiments, the low-melt fiber has a melting point of greater than 60° C. In some preferred embodiments the melting point of the low-melt fiber is from 100° to 200° C. Low-melts having a melt point above 210° C. are undesired in many embodiments because they require such high temperatures to soften that other components in the fabric, such as elastic fiber may begin to degrade during the manufacture. Low melt is meant to have its traditional polymer definition; these materials flow in the manner of a viscous liquid when heated and solidify when cooled and do so reversibly time and time again on subsequent heating and cooling steps. Melting points are measured by ASTM Method D3418. Melting points are taken as the maximum of the melting endotherm, and are measured on the second heat at a heating rate of 10 degrees Celsius per minute.

The low-melt fiber comprises a low-melt polymer that has a melting temperature of greater than 60° C. but lower than 200° C. In some preferred embodiments, the melt temperature of the low-melt polymer is 100° C. to 180° C. In some most preferred embodiments the low melt polymer has a melting temperature of 160° C. Low-melt fibers made from low-melt polymers having a melting temperature of greater than 100° C. are useful as stabilizing yarn for innovation fabrics while surviving normal fabric and garment manufacturing process without appreciably softening or melting. Selection of the low-melt fiber is dependent on the final properties of the material and the balance of heat required to finish, dye and wash the fabrics and garments versus the temperature the fabrics and garments will see during thermal activating process. As examples, for some types of undyed hosiery and lingerie garments, the melting temperature could be selected between 60° C. to 100° C. for better boarding and setting while surviving low pressure steam treatment. For the fabrics which need to be dyed at high temperature, such as polyester disperse dye, higher melting temperature yarn are required, e.g. 180° C.

Low-melt polymers can be selected from a group of materials with melting temperature no lower than 60° C. but no higher than 200° C., including modified polyester, modified nylon, polypropylene, polyethylene, acrylic and the copolymers of polyesters, polyamides and polyolefin. The modified polymers and copolymers allow precise targeting of the desired thermal behaviors.

In some embodiments of this invention, the preferred low-melt fiber is made from polyamides or polyesters having adequate crystallinity or orientation to have a melting temperature of greater than 60°, but no greater than 200° C. In some embodiments, the low-melt fiber useful in this invention can be selected from the group consisting of polyolefin, polyimide, polyetherketone, polyamide-imide, polyether-imide, and mixtures thereof. In some preferred embodiments the polyester fiber comprises polyethylene naphthalate (PEN) polymers. Useful polyester polymers can include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The PET may be obtained by known polymerization techniques from either terephthalic acid or its lower alkyl esters (e.g. dimethyl terephthalate) and ethylene glycol or blends or mixtures of these. PEN may be obtained by known polymerization techniques from 2,6-naphthalene dicarboxylic acid and ethylene glycol.

In some embodiments, the low-melt fiber is made up with 100% low melt polymers. The cost of such mono-polymers has advantages for some applications. In this case only a small fraction of such pure fiber is needed to add and blend with rigid fiber and elastic fiber together.

In some embodiments of this invention, the low-melt fiber is made from low-melt bi-component fiber, which is a combination of a regular fiber polymer and a low-melt polymer in one single fiber. The fiber has at least two separate and distinct regions of different compositions with a discernable boundary along the fiber length. The low-melt polymer component can be fused in the range of 60° C. to 200° C. temperature, the temperature lower than one used for heat setting elastic fiber. This compound will make the fiber bundle as fibrous form after thermal activating process, unlike the collapse phenomenon happened for mono-component fiber.

Based on the cross sectional shape and geometry position, bi-component low-melt fibers can be selected from following groups as sheath-core, side-by-side, islands-in-the-sea, segmented pie and other structures. In side-by side structure, two polymers components are divided into two or more distinct regions, lying side-by-side along the length. In sheath-core structure, core component is fully surrounded by the sheath component. This structure is employed when it is desirable for the surface to have good bonding and fusing, while the core may contribute to strength. The sheath of the fiber is low-melt polymer with lower melting point than the normal polymer in core and so in an elevated temperature, the sheath melts, creating bonding pints with adjacent fibers.

For islands-in-the-sea structure fibers, one polymer is in a matrix of a second polymer. In segmented pie structure, the fiber contains alternate pie or wedges around the fiber circle with low-melt polymers.

In one implementation of this invention, an article is made from a fabric comprising low-melt bi-component with core-sheath structure. The core is high melting polymers used in traditional textile fibers, including in polyester, polypropylene, Nylon 6, Nylon 66. A variety of different low-melt polymers with low melting temperature are useful with present invention in sheath materials, such as polyethylene, modified polyester, modified nylon, modified polypropylene, and the copolymers of polyesters, polyamides and polyolefin. During normal textile process, including finishing and dyeing, the low-melt fiber look and behave as normal textile fiber. After thermal activating process, the surface polymer become soften, fused and bound with neighbor low-melt fiber, elastic fiber and rigid fiber to form some points, while the core normal polymer remains unchanged to form stabilizing yarns.

We discovered that the invention fabric comprising low-melt fiber can be made with various stretch level in different locations on the garment by applying different heat. Thermal activating process can be done in certain area to form stretch/recovery enhancement. When extra heat is applied on to certain pre-determined area, the fusion rate and set efficiency is high and the fabric has less stretch level within the area, which is called "shaping zone". In such shaping zones, the fabrics have high stretch modulus and higher retract force, which limit the fabric deformation as compared to no shaping area. As human body movement, such that the garment shape can get strategically relocated and get shaping effects during wearing.

The portion of the human body surface to which the shaping zone is applied is subjected to a tightening force, and therefore the difference between said shaping zone and no-shaping zone appears because of the pressure difference. This fabric in shaping zone may act to the shape of the body contours and to smooth or control the display of some of the key areas. The shaping zone may thus be tailored to extend over only those regions where it is desired.

It will be appreciated that the shaping zone is not located all over the garment, so as to produce an allover squeeze but is provided in carefully selected areas. The results of the positioning of the shaping zone is to provide support and shaping to the contours of the body, slimming the thighs, lifting the buttocks and flattening the abdomen, thus creating an improved silhouette rather than simply constricting the entirely of the lower body.

Figure 7:
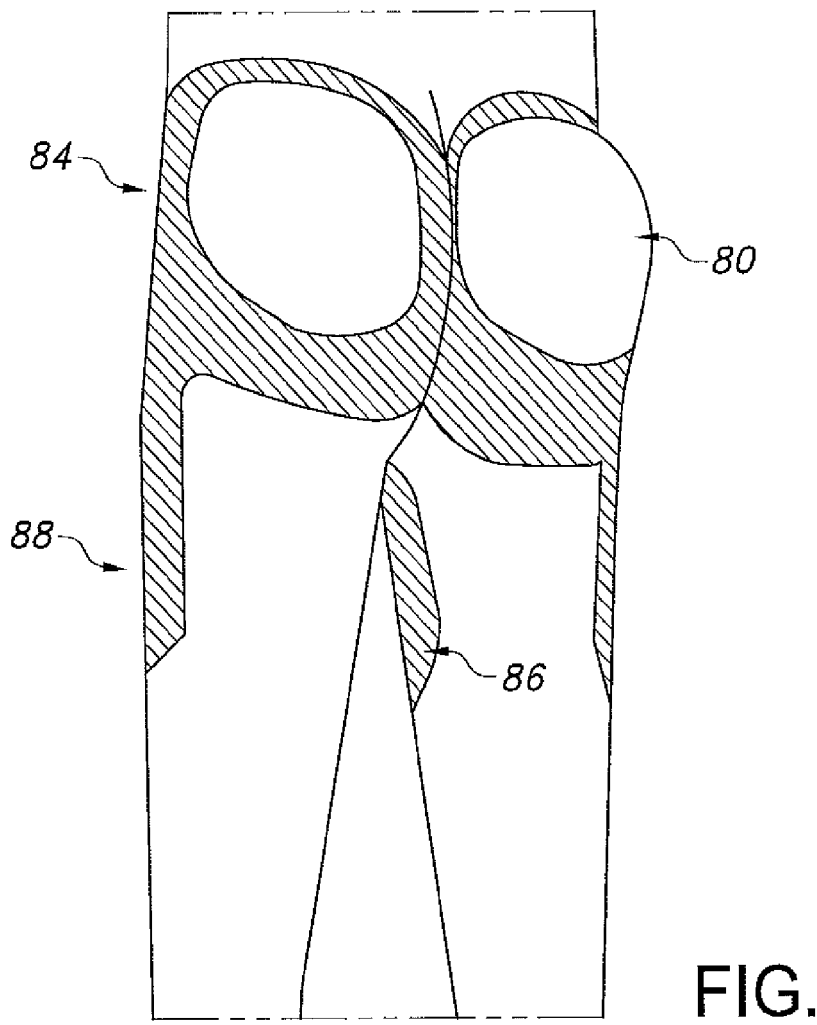
FIG. 7 is an illustrated garment with fused shaping area in butt-shaping zone, arranged in the rear portion of the wearer's body around the buttock area as a curved U shape.

In some embodiment of the invention, the shaping zone is applied in Butt Shaping zone, as shown in FIG. 7. The shaping zone is arranged around the buttock as a curved U shape. The Butt-shaping band 84 may push the butts of the wearer up and concentrates the butts so as to make the contours of the butts look more rounded and elevated. It pushes both sides of the butts so that sides of the hips do not protrude and voluminous butt contours can be shown. Referring to FIG. 7, the butt-shaping band 84 is symmetrically. The butt-shaping band pushes the hips of the wearer up in an arrow direction and includes the pocket portion, and tightens the butts in the arrow direction.

In some embodiments of this invention, the shaping zone is placed in Thigh Slenderizing zone: The shaping zone 88 and 86 are applied in inside of thigh, or/and outside of the thigh areas of the wearers, from a knee region to a crotch region and from a knee region to a hip region, as shown in FIG. 7. This shaping zone 88 and 86 may act as to slim thigh and to lift the buttock. As described above, the compression bands 26 and 28 push and carve out the outer and inner portion of the thighs of the wearer in the arrow direction c to make the thighs look thin, smooth and slim.

In some embodiment of the invention, the shaping zone is implemented in Tummy Flatter zone. The shaping zone is placed to cover abdominal portion of the wearers. In use, at least one shaping zone may extend across the lower abdomen of a wearer from a waist region to a crotch region. In some embodiments, the shaping zone is applied as a band in front portion of the pant, from hip to crotch area. The shaping zones may thus act to flatten the lower abdomen of a wearer. It eliminates excess bulging, provides core stability and promotes body awareness, while providing a smooth look all around and providing abdominal compression while enhancing the posture of the wearer. For a figure-hugging fit, the shaping zone lifts and defines wear's body and gives wearer a beautiful, shaped silhouette.

In some embodiments, the shaping zone fabric is disposed in front of knee area. While the shaping zone keeps the pants leg straight and slack, it also provide better abrasion resistance and high fabric strength to improve the garment durability in this area.

Figure 8:
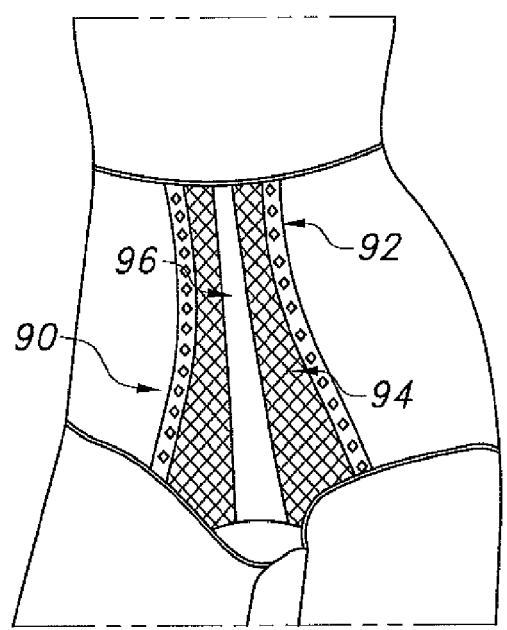
FIG. 8 An illustrated garment with the shaping zone in belly-slimming zone, placed in front of belly of a high waist underwear.

In some embodiments, the shaping zone is arranged in Abdomen Tighten zone, around waist area 92, 94 and 96 in front of abdomen on the garment, such as high waist underwear as shown in FIG. 8. Through the higher holding force of shaping zone in this area, the wear's waist may look as narrower.

In some embodiments, the shaping zones are placed in the leg area 102 and foot area 100 for hosiery and leg wears, as shown in FIG. 9. This shaping function can be used as medical or sport or casual wear purpose, by increasing the holding force or compressional force in these areas.

The shapes of the shaping zone can be modified variously to shape the hips and thighs using the above method. Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

It will be appreciated that the garment may comprise more than one shaping zone, for example, thigh slenderizing, flatter tummy, and butt-up zone, thus sliming the thighs, lifting the buttocks and flattening the lower abdomen. The shaping zone may connect and or be integrally formed or they may be discrete areas of the garment.

In a specific implementation, the shaping zone has a graduated edge. FIG. 8 show a shaping zone 90 with graduated edge 92 on the board between the shaping zone and no-shaping zone. The graduated edge provides a smooth, seamless transition between the shaping zone and no-shaping zone. As a result, no visible seams or lines, hems, or edges, show through the outer fabric when the pants are worn by the wearer. Within the shaping zone, the low-melt fiber is melt all over the area. While in graduated edges, only some part of the low-melt fiber is melt, but some keep in un-melt form (shown as white space in area 92 in FIG. 8), where the low-melt fiber does not melt or fused. In a specific implementation, a width of the gradation edge is about ½ inch to about 1.5 inch. In other implementations, the dimension of the gradation edge can be less or more, and the melt spots area can also be graduated in varying intensities.

As described above, it is not necessary that the shaping is made according to a pattern. The shape of the panel can be indefinite and arbitrary (e.g., straight, curved, graduated, stipulated, or patterned). Furthermore, in some implementations, the edge may not be visible on the inside surface of the fabric because it is hidden by a seam, other material or fabric. The shaping zone may be added on garment to form various figure shapes to add functional and beauty effects. Some of the patterns and shapes include in triangle, lines, dot and others figures.

In a special implementation, there are several different shape patterns within a shaping zone. FIG. 8 shows some of the pattern shapes in a shaping zone in from of the abdomen. Shape pattern 92 is graduated edge. Shape pattern 94 is a modest-fused zone, where the low-melt fiber is partially melt. Shape pattern 96 is a severe-fused zone, where the low-melt fiber is totally melt and fused. As the more low-melt fiber fused, the fabric has less stretch and has high holding force with strong shaping effects. So, the garment special shaping effects could be achieved through engineered designing.

In a special implementation, fabric shape pattern and different fusion rate are generated by applying the controlled heat in predetermined area. High temperature, or long time or high pressure is applied in the shaping zone with severe melt.

The thermal activating process can be accomplished by exposing the invention fabric to heat and or static pressure up to 5 bars depending on the composition of the low-melt polymer. Heat can be applied as steam or dry heat. Suitable thermal activating process conditions can vary depending on many factors including the selected fusibility improvement additive, polymer chemistry, yarn linear density, and fabric construction (i.e., knit, woven, etc.), among other factors. For example, preferred activating conditions for hosiery can include exposure to temperatures from about 90° C. to about 140° C., including from about 105° C. to about 135° C. for about 3 seconds to about 60 seconds, when steam heat is used, and 165° C. to about 195° C. for about 3 seconds to about 60 seconds, when dry heat is used. Preferred thermal activating process for circular knit, warp knit and woven fabrics, such as denim, include exposure to temperatures from about 110° C. to about 200° C., including from about 160° C. to about 180° C. for about 30 seconds to about 5 minutes, when dry heat is used.

The thermal activating process can be conducted in grey fabric, finished fabric, fabric panel during cut and sew of garment making, or final garments. The thermal activating process can also be applied on whole piece of fabric or certain parts or spots of fabrics. Typical processing condition is 60° C. to 180° C. for 1-4 minutes. The process methods include pressing, laminate, oven, tent frame, heat plate or other methods. The heat treatment can be accomplished by simply subjecting the dry fabric to a temperature between 100 C to 200 C for 1-2 minutes, a very simple step. It also can be processed under complicated temperature profile under different patterns.

Thermal activating process may be incorporated into the garment during construction of the garment. Dyeing and finishing of the garment may be conducted before or after assembly of the garment with shaping effect. There are some benefits to develop shaping zone prior to fabric finishing. One example is where in a denim fabrics, including tend to shrink upon fabric finishing. During wear of the garment, growth tends to occur. By including a shaping zone, growth of the fabric is resisted in addition to the benefits of flat and smooth fabric surface. The garment dyeing and finishing processes improve the elastic properties including the modulus of the fabric.

Other forms of thermal activating processes are also available, including but not limited to, microwave, infrared, conduction, ultrasonic and laser technology. The selection of machine setting for each technologies, mainly based on low-melt behaviors and the fabric performance requirement. Among them, the density of laser energy or power density and scanning speed are the most important for laser technology.

Fabrics are exposed to a variety of process conditions that include exposure to heat and/or pressure. Therefore, in some of embodiments, a separate heat-setting/fusing process is not required because the heat setting of the fabric will also result in fusing of the yarns. If heatset required, consider to use lower temperature and short time.

Thanks to the adhesive force and interlocking structure, the fabric of the present invention has better visual effects, showing a flat and smooth surface appearance. The fabric of the invention has a less tendency of elastic fiber seam slippage and running and fabric curving. It can prevent seam slippage and running and curving after thermal activating process between elastic fibers with neighbor fibers as well. The low-melt fiber can stand the repeat wash in fabric and garment finishing process and home laundry.

In some embodiment, low-melt fiber has less soft hand touch feeling as compared with regular textile fibers. This could become harsher after thermal activating process if the content of low-melt fiber is too high. In contrast, when the low-melt fiber content is lower than 1%, the fabric is unable to deliver good easy-setting and good shaping performance. Some low-melt polymer has high pick-up rate for dye stuff. The fiber could have deep color that rigid fiber in the fabric. It was surprised to find that the low-melt fiber with optimum weight content can be hidden inside fabric and don't show up in the surface of the fabric. The preferred content of low-melt fiber is between about 1% to about 55% of the total fabric weight. Within preferred content range, low-melt fiber is invisible or substantially invisible and untouchable from the back and the surface of the fabric. The appearance and touch feel of the fabric has not noticeable change. The low-melt fiber is hidden during garment is worn. Unlike film or fabric laminate and extra panel and special weaving and knit structures, the low-melt fiber doesn't form film or a different appearance on fabric surface. When low-melt fiber is used, the fiber in buried inside fabric body which avoid the unpleased shinning and rubbery touch surface. The fiber is also invisible from outside and inside of garment with good breath ability.

A variety of different fibers and yarns may be used with the fabrics and garments of some embodiments. These include cotton, wool, acrylic, polyamide (nylon), polyester, spandex, cellulose, rubber (natural or synthetic), bamboo, silk, soy or combinations thereof.

In addition, garments including shaping zone can be molded. For example, fabric can be molded under conditions appropriate for the rigid fiber in the fabric. Also, molding may be possible at temperature which will mold the shaped article, but below temperatures suitable for molding the rigid fiber. Examples of apparel or garments that include a shaping zone falling within the scope of the present invention include but are not limited to: jeans, pants, khakis, leggings, blouses and et.

Analytical Method

In the examples that follow, the following analytical methods were used.

Fabric Elongation (Stretch)

Fabrics are evaluated for % elongation under a specified load (i.e., force) in the fabric stretch direction(s), which is the direction of the composite yarns (i.e., weft, warp, or weft and warp). Three samples of dimensions 20 cm×6.5 cm were cut from the fabric. The long dimension (25 cm) corresponds to the stretch direction. The samples are partially unraveled to reduce the sample widths to 5.0 cm. The samples are then conditioned for at least 16 hours at 20° C.+/−2° C. and 65% relatively humidity, +/−2%.

A first benchmark was made across the width of each sample, at 6.5 cm from a sample end. A second benchmark was made across the sample width at 20.0 cm from the first benchmark. The excess fabric from the second benchmark to the other end of the sample was used to form and stitch a loop into which a metal pin could be inserted. A notch was then cut into the loop so that weights could be attached to the metal pin.

The sample non-loop end was clamped and the fabric sample was hung vertically. A 30 Newton (N) weight (6.74 LB) is attached to the metal pin through the hanging fabric loop, so that the fabric sample is stretched by the weight. The sample was "exercised" by allowing it to be stretched by the weight for three seconds, and then manually relieving the force by lifting the weight. This cycle was carried out three times. The weight was allowed then to hang freely, thus stretching the fabric sample. The distance in millimeters between the two benchmarks was measured while the fabric was under load, and this distance is designated ML. The original distance between benchmarks (i.e., unstretched distance) was designated GL. The % fabric elongation for each individual sample as calculated as follows:

% Elongation $(E\%) = ((ML-GL)/GL) \times 100$

The three elongation results were averaged for the final result.

Fabric Growth (Unrecovered Stretch)

After stretching, a fabric with no growth would recover exactly to its original length before stretching. Typically, however, stretch fabrics will not fully recover and will be slightly longer after extended stretching. This slight increase in length is termed "growth."

The above fabric elongation test must be completed before the growth test. Only the stretch direction of the fabric was tested. For two-way stretch fabric both directions were tested. Three samples, each 25.0 cm×6.0 cm, were cut from the fabric. These were different samples from those used in the elongation test. The 25.0 cm direction should correspond to the stretch direction. The samples were partially unraveled to reduce the sample widths to 5.0 cm. The samples were conditioned at temperature and humidity as in the above elongation test. Two benchmarks exactly 20 cm apart were drawn across the width of the samples.

The known elongation % (E %) from the elongation test was used to calculate a length of the samples at 80% of this known elongation. This was calculated as $E$(length) at $80\% = (E\%/100) \times 0.80 \times L$, where L was the original length between the benchmarks (i.e., 20.0 cm). Both ends of a sample were clamped and the sample was stretched until the length between benchmarks equaled L+E (length) as calculated above. This stretch was maintained for 30 minutes, after which time the stretching force was released and the sample was allowed to hang freely and relax. After 60 minutes the % growth was measured as % Growth=$(L2 \times 100)/L$, where L2 was the increase in length between the sample benchmarks after relaxation and L was the original length between benchmarks. This % growth was measured for each sample and the results averaged to determine the growth number.

Fabric Recovery

Fabric recovery means that fabric is capable of recovery to its original length after deformation from elongation or tension stress. It is expressed as a percentage ratio of the increased extended length of a fabric under tension to the length of the fabric following release of elongation or tension stress. It can be calculated from fabric stretch and fabric growth.

Woven Fabric Shrinkage

Fabric shrinkage was measured after laundering. The fabric was first conditioned at temperature and humidity as in the elongation and growth tests. Two samples (60 cm×60 cm) were then cut from the fabric. The samples were taken at least 15 cm away from the selvage. A box of four sides of 40 cm×40 cm was marked on the fabric samples.

The samples were laundered in a washing machine with the samples and a loading fabric. The total washing machine load was 2 kg of air-dried material, and not more than half the wash consisted of test samples. The laundry was gently washed at a water temperature of 40° C. and spun. A detergent amount of 1 g/l to 3 g/l was used, depending on water hardness. The samples were laid on a flat surface until dry, and then they were conditioned for 16 hours at 20° C.+/−2° C. and 65% relative humidity+/−2% rh.

Fabric sample shrinkage was then measured in the warp and weft directions by measuring the distances between markings. The shrinkage after laundering, C %, was calculated as $C\% = ((L1-L2)/L1) \times 100$, where L1 was the original distance between markings (40 cm) and L2 is the distance after drying. The results are averaged for the samples and reported for both weft and warp directions. Negative shrinkage numbers reflect expansion, which was possible in some cases because of the hard yarn behavior.

Fabric Weight

Woven Fabric samples were die-punched with a 10 cm diameter die. Each cut-out woven fabric sample was weighed in grams. The "fabric weight" was then calculated as grams/square meters.

Elastic Fiber Seam Slippage

Fabric specimens are tested under standardized conditions of temperature, time and mechanical action to recreate the elastic fiber slippage that occurs in industrial garment washing and home laundering. Subsequently, elastic fiber slippage is measured according to the standard procedure shown. Two representative 50×50 cm fabric specimens cut parallel to the fabric length and width are prepared. Each specimen should contain different groups of warp and weft yarns. The specimen should be marked to indicate the warp direction.

Each specimen should over locked using following conditions to prevent raw edges from unraveling during washing: Sewing needle: 100-110 SUK systems; Sewing thread: 30 Nm/3 piles for both needle and bobbin thread; Stitch density: 3-4 stitch per cm.

The fabric samples are washed and dried in following conditions: Wash machine: similar to a Tupesa TSP-15, 1 vertical machine with a single 75 cm diameter compartment; Bath temperature: 98° C.; Process time: 90 munities; Liquor ratio: 1/8; Machine speed: 25-28rp; PH: 10; Salt: 20 gr/1; Drying temperature: 90° C.

After finishing washing and tumble drying, condition the specimens for at least 16 hours by laying each specimen as a single layer. Slightly steam irons the sample in order to facilitate measuring.

The elastic fiber seam slippage is measured through following way: along both two sides of specimen warp and/or weft direction, select two spots to mark and cut the fabrics. In each spot, cut 5 cm in fabric width and/or length direction and carefully remove the over locked stitch threads. Under the fabric inspection light, remove the weft yarns and/or warp yarn one after another from the above 5.0 cm area and observe for warp/weft elastic fiber. Sometime de-twisting the covered yarn is needed to find out the elastic fiber. Stop removing weft/warp yarn as soon as the elastic fiber appears. The distance between the fabric edge to elastic position is measured. The average of this distance in two specimens is considered as elastic fiber slippage in centimeters.

EXAMPLES

The following examples demonstrate the present invention and its capability for use in manufacturing a variety of fabrics. The invention is capable of other and different embodiments, and its several details are capable of modifications in various apparent respects, without departing from the scope and spirit of the present invention. Accordingly, the examples are to be regarded as illustrative in nature and not as restrictive.

For each of the following denim fabric examples, 100% cotton open end spun yarn or ring spun was used as warp yarn. For denim fabrics, they included two count yarns: 7.0 Ne OE yarn and 8.5 Ne OE yarn with irregular arrangement pattern. The yarns were indigo dyed in rope form before beaming. Then, they were sized and made the weaving beam.

Several composite yarns with elastic fibers and low-melt fibers were used as weft yarn. Various composite yarns, including single covering, air jet covering and dual core spun. Table 1 lists the materials and process ways that were used to make the composite yarns for each example. Table 2 and 3 shows the detail fabric structure and performance summary for woven and knit fabrics. Lycra® spandex are available from Invista, s. á. r. L., Wichita, Kans. For example, in the column headed spandex 40D means 40 denier; 3.5× means the draft of the Lycra® imposed by the core spinning machine (machine draft). The low-melt bi-component is made from Huvis company. The low-melt polyolefin fiber is made from Invista, s. á. r. L., Wichita, K. In the column headed 'Rigid Yarn', 20's is the linear density of the spun yarn as measured by the English Cotton Count System. The rest of the items in Table 1, 2 and table 3 are clearly labeled.

Stretch woven fabrics were subsequently made, using the composite yarn of each example. Table 2 summarizes the yarns used in the fabrics, the weave pattern, and the quality characteristics of the fabrics. Some additional comments for each of the examples are given below. Unless otherwise noted, the fabrics were woven on a Donier air-jet or rapier loom. Loom speed was 500 picks/minute. The fabric is 3/1 twill. The widths of the fabric were about 76 and about 72 inches in the loom and greige state respectively. The loom has double weaving beam capacity.

Each greige fabric in the examples was finished by a jiggle dye machine. Each woven fabric was pre-scoured with 3.0 weight % Lubit®64 (Sybron Inc.) at 49° C. for 10 minutes. Afterwards it was de-sized with 6.0 weight % Synthazyme® (Dooley Chemicals. LLC Inc.) and 2.0 weight % Merpol® LFH (E. I. DuPont Co.) for 30 minutes at 71° C. and then scoured with 3.0 weight % Lubit® 64, 0.5 weight % Merpol® LFH and 0.5 weight % trisodium phosphate at 82° C. for 30 minutes.

Example 1: Low Melting Fiber: Bi-Component Fiber

Low melting fiber LOMELA™, manufactured by HUVIS Company, is used for making the composition yarn and fabrics. LOMELA™ is low melting bi-component filaments with core and sheath structure. The sheath is a low melting polymer and core is regular polyester fiber. During thermal activating processing, the fiber can easily develop bonding function where a stable form is required. The yarn is 75 denier with 36 filaments. The melting temperature is 165° C. for sheath component part. When the heat temperatures lower than 150° C., the fiber looks and behaves as regular polyester fiber. When the temperature reach 150° C. or higher, the low melting sheath start to soft and melt. When the temperature reach 165° C., the sheath portion is totally melt and fused with core fiber. The individual 36 filaments are melt and bound together to form a single thread bundle. It also connect and bond with neighbor rigid fiber and elastic yarn to form a cross linking structure within the fabric.

Example 2: Low-Melt Fiber: Mono-Component Fiber

A mono-component fiber comprising "polyolefin" polymer is used as low melting fiber. The fiber is spun into 40D with one filament. The fiber starts to melt at 135.65° C. and reach to melting peak at 146.26° C. The thermal activating process can be conducted in the temperature range of from about 120° C. a period of 5 seconds to several minutes. After melting, it bonds with neighbor rigid fiber and elastic fiber to form a cross linking structure within the fabric.

Example 3: Single Covered Yarn

75D/36f low-melting bi-component yarn is wrapped around a core of 40D LYCRA® fiber. The LYCRA® fiber is stretch out at 3.0× during covering. The yarn has high recovery and shiny aesthetic on surface due to low-melting bi-component fiber. This covered yarn can be used for hosiery, pantyhose, socks and knit and woven applications.

Example 4: Air Jet Covered Yarn with Two Fibers

75D/36f low-melting bi-component yarn is intermingled around a core of 70D LYCRA® fiber by using an air jet nozzle. LYCRA® fiber has draft 3.3× during covering. The interlacing knot are 75 knots per meter. The air pressure is 4 bar and the processing speed is 650 meters per minute. The yarn could be used for hosiery, pantyhose, socks and knits. It also can be used as core in core spun yarn covered with cotton or other staple fibers.

Example 5: Air Jet Covered Yarn with Three Fibers

140D/144f polyester filament and 75D/36f low-melting bi-component yarn are intermingled with a core of 40D LYCRA® fiber by using an air jet nozzle. LYCRA® fiber has draft 3.3× during covering. Three yarn are interlaced together with 96 knots per meter. The air pressure is 4.5 bar and the processing speed is 650 meters per minute. The yarn could be used for weft yarn in woven fabrics.

Example 6: Air Jet Covered Yarn with Two Elastic Yarns

150D/68f LYCRA® T400® polyester bi-component fiber and 75D/36f low-melting bi-component yarn are intermingled with 40D LYCRA® fiber by using an air jet nozzle. LYCRA® fiber has draft 3.3× during covering. Three yarn are interlaced together with 82 knots per meter. The air pressure is 4.5 bar and the processing speed is 650 meters per minute. The yarn could be used for weft yarn in woven fabrics. Because LYCRA® T400® fiber is also an elastic yarn, this composite yarn has very good recovery power and stretch level.

Example 7: Air Jet Covered Yarn with 70D Elastic Fiber

140D/144f polyester filament and 75D/36f low-melting bi-component yarn are intermingled with a core of 70D LYCRA® fiber by using an air jet nozzle. LYCRA® fiber has draft 3.3× during covering. Three yarns are interlaced together with 90 knots per meter. The air pressure is 4.5 bars and the processing speed is 650 meters per minute. As compared with Sample 5, this yarn is more powerful due to more LYCRA® fiber is used. The yarn could be used for weft yarn in heavier weight woven fabrics, such as denim.

Example 8: Core Spun Yarn with AJY Yarn

The core yarn is first made in the way as described in Example 4. It is 70D LYCRA® fiber with 75D/36f low-melting bi-component air jet covered yarn. Then, the cotton sheath fiber is spun around this core yarn in a core spun machine. During core spun process, the core yarn is kept in straight form, so it can maintain in the center of the yarn without exposure. The yarn is 16s English counter with 4 TM twister level. It can be used as weft yarn for woven fabric, such as khakis and denims.

Example 9: Dual Core Spun Yarn

The core yarn has two filaments: 105D LYCRA® fiber and 75D/36f low-melting bi-component fiber. The sheath fiber is cotton fiber. The cotton fiber is spun around these two core yarns together in a core spun machine with double deliver device. During core spun process, 105D LYCRA® fiber and 75D/36f low-melting bi-component fiber are fed into twist are together, but with different draft level. LYCRA® fiber is drafted as 3.8× time of its original length; while low-melting fiber is only draft 1.05× time. The total yarn count is 16s English counter with 4 TM twister level. It can be used as weft yarn for woven fabric.

Example 10: Dual Core Spun Yarn with Elastic Polyolefin

The core yarn has two filaments: 40D LYCRA® fiber and 40D low-melting polyolefin fiber, as described in Example 2. The sheath fiber is cotton fiber. The cotton fiber is spun around these two core yarns together in a core spun machine with double deliver device. During core spun process, 70D LYCRA® fiber and 40D low-melting mono-component polyolefin fiber are fed into twist are together, but with LYCRA® fiber draft as 3.5× time of its original length. The total yarn count is 16s English counter with 4 TM twister level. It can be used as weft yarn for woven fabric.

TABLE 1

Elastic Composite yarn comprising low-melt fiber

| Example | covering method | Fiber 1: rigid fiber | Fiber 2: Elastic Core fiber types | Low Melt Fiber Content % | Yarn 2: Elastic Core fiber deniers | Yarn2: Elastic Core fiber draft | Yarn 3: low melt fiber | covering method | content % of elastic fiber | content % of low melt fiber |
|---|---|---|---|---|---|---|---|---|---|---|
| 3 | single cover | | T162B LYCRA® fiber | | 44 dtex (40 D) | 3.0 X | 75 D/36 f low melt bicomponent yarn | twist covered | 15.1 | 84.9 |
| 4 | air jet cover | | T162B LYCRA® fiber | | 78 dtex (70 D) | 3.3 X | 75 D/36 f low melt bicomponent yarn | air jet covered | 22.0 | 78.0 |
| 5 | air jet cover | 140 D/144 polyester | T162C LYCRA® fiber | | 44 dtex (40 D) | 3.3 X | 75 D/36 f low melt bicomponent yarn | air jet covered | 5.8 | 32.9 |
| 6 | air jet cover | 150 D/68 bicomponent polyester | T162C LYCRA® fiber | | 44 dtex (40 D) | 3.3 X | 75 D/36 f low melt bicomponent yarn | air jet covered | 5.6 | 31.5 |
| 7 | air jet cover | 140 D/144 polyester | T162C LYCRA® fiber | | 78 dtex (70 D) | 3.3 X | 75 D/36 f low melt bicomponent yarn | air jet covered | 9.0 | 31.8 |
| 8 | core spun | 16 cotton | T162B LYCRA® fiber | | 78 dtex (70 D) | 3.3 X | 75 D/36 f low melt bicomponent yarn | Air jet covered first then dual | 6.4 | 22.6 |
| 9 | core spun | 16 cotton | D48 LYCRA® fiber | | 116 dtex (105 D) | 3.8 X | 75 D/36 f low melt bicomponent yarn | Direct dual core spun | 8.3 | 22.6 |
| 10 | core spun | 16 cotton | T162C LYCRA® fiber | 8 | 44 dtex (40 D) | 3.8 X | 40 D low melt polyolefin yarn | Direct dual core spun | 6.4 | 4.0 |

| Example | weft yarn | Fabric on loom (warp EPI × weft PPI) | Finshed fabric Width, inch | Fabric Weight OZ/Y^2 | Fabric Stretch % | Fabric Growth % | Fabric Recovery % | Fabrci Shrinkage % (Warp × Weft) | Fabric Weight OZ/Y^2 | Fabric Stretch % | Fabric Growth % | Fabric Recovery % |
|---|---|---|---|---|---|---|---|---|---|---|---|---|
| | | | | | Fabrics after Normal Finishing | | | | Fabrics after Thermal Activation | | | |
| 11 | 16 S cotton/70 D LYCRA® fiber/75 D low melt bicomp fiber Direct CSY | 64 × 54 | 50.8 | 11.797 | 41.1 | 8.1 | 75.4 | −5.46 × −8.58 | 10.406 | 12.5 | 1.8 | 82 |
| 12 | 16 S cotton/70 D LYCRA® fiber/75 D low melt bicomp fiber AJY then CSY | 64 × 54 | 49 | 12.887 | 55.8 | 3.2 | 92.8 | −5.30 × −6.68 | 10.434 | 9 | 1.3 | 81.9 |

TABLE 1-continued

| | | | | | | | | | | |
|---|---|---|---|---|---|---|---|---|---|---|
| 13 | 140 D/144 f polyester/70 DLYCRA® fiber/75 D low melt bicomp fiber AJY | 64 × 62 | 51 | 10 | 11.670 | 51.2 | 3.5 | 91.5 | −7.94 x −11.08 | 11.788 | 28.7 | 3.8 | 83.4 |
| 14 | 150 D/68 f/40 D fiber + 40 D LYCRA® fiber + 75 D low melt bicomp fiber AJY | 64 × 62 | 51 | 10 | 11.003 | 44.7 | 3 | 91.6 | −7.42 x −8.62 | 11.421 | 23.2 | 3.2 | 82.8 |
| 15 | 14 S cotton/40 D LYCRA® fiber CSY + 75 D low melt bicomp fiber Co-Insertion | 64 × 45 | 51.5 | 8 | 12.009 | 35.3 | 6.9 | 75.6 | −7.55 x −11.98 | 11.929 | 18.7 | 4.7 | 68.6 |
| 16 | 150 D/68 f LYCRA® T400® fiber/40 D LYCRA® fiber + 75 D low melt bicomp fiber Co-insertion | 64 × 62 | 51 | 10 | 10.946 | 45.1 | 2.7 | 92.5 | −7.05 x −9.40 | 11.477 | 23.7 | 3.1 | 83.6 |
| 17 | 16 S cotton/40 D LYCRA® fiber/40 D low melt polyolefin CSY | 64 × 54 | 51 | 2 | 12.1 | 45.5 | 5.7 | 84.33 | 5.99 x −7.8 | 10.9 | 39.3 | 5.3 | 83.1 |

TABLE 3

Knit Fabric Example List

| Example | rigid fiber | Elastic fiber | low melting fiber | elastic fiber draft | Fabric Weight OZ/Y^2 | Fabric Stretch in wale direction % | Fabric Stretch in course direction % | Rigid fiber content | Low melting bi-component fiber content | Elastic fiber content | Knit strucutre |
|---|---|---|---|---|---|---|---|---|---|---|---|
| 18 | 2 × 30 s indigo dyed cotton | 70 D T162C LYCRA ® fiber | 75 D/36 f low melt bi-component yarn | 2.4 X | 8.4 | 70 | 30.1 | 67.5 | 23.3 | 9.2 | ½ twill |
| 19 | 50 s Supima cotton spun yarn | 40 D T162C LYCRA ® fiber | 75 D/36 f low melt bi-component yarn | 3.0 X | 12.9 | 131 | 99 | 56.5 | 37.3 | 6.3 | jersey |
| 20 | 70 D/72 f Polyester fiber | 40 D T162C LYCRA ® fiber | 75 D/36 f low melt bi-component yarn | 3.0 X | 12.3 | 140 | 117 | 46.1 | 46.1 | 7.8 | jersey |
| 21 | 50 s cotton | 30 d T162C LYCRA ® fiber | 75 D/36 f low melt bi-component yarn | 2.2 X | 9.5 | 100 | 79 | 50.5 | 34.2 | 6.3 | ½ twill |
| 22 | 60 s cotton | 20 d T162C LYCRA ® fiber | 75 D/36 f low melt bi-component yarn | 2.2 X | 9.3 | 118 | 99 | 56.4 | 38.9 | 4.8 | ½ twill |

Example 11: Stretch Woven Comprising Low-Melting Fiber

The warp yarn was 7.0 Ne count and 8.4 Ne count mixed open end yarn. The warp yarn was indigo dyed before beaming. The fabric is woven with the structure 3/1 twill, 64 ends and 54 picks per inch, and 76 inch width. The weft yarn is 16S dual core spun yarn with cotton sheath. The core yarns have two kinds of filaments: 70D LYCRA® fiber and 75D/36f low-melting bi-component fiber. The cotton fiber is spun around these two core yarns together in a core spun machine. During core spun process, 70D LYCRA® fiber and 75D/36f low-melting bi-component fiber are fed into twist are together, but with different draft level. LYCRA® fiber is drafted as 3.8× time of its original length; while low-melting fiber is only draft 1.05× time.

Table 2 lists the fabric performance after normal finishing process and after thermal activating process. We can see that the fabric have good stretch (41.1%), good recovery (75.1%) and low shrinkage (8.56%) after normal finishing process.

When the garment is made with the fabric after normal finishing process, the fabrics in certain critical areas, such as in Butt shaping zone, Thigh Slenderizing shaping zone and Tummy flatter zone, are treated extra heat during thermal activating process at 182° C. for 45 seconds, the fabric stretch, recovery and shrinkage become 12.5%, 82% and 0% in weft direction respectively. The fabric stretch level will reduce and the holding force will increase, which can offer shaping effects on the garment. Fabric has no grin through. Elastic filaments and low-melting fiber can't be seen from both fabric surface and fabric back.

Example 12: Stretch Woven Comprising Low-Melting Fiber

This fabric has the same material and fabric structure with Example 11. The only difference is the dual core yarn structure. In Example 11, two core fibers 70D LYCRA® fiber and 75D/36f low-melting bi-component fiber, are fed into core spun yarn machine directly from bare yarn package. While in Example 12, two core fibers 70D LYCRA® fiber and 75D/36f low-melting bi-component fiber are first interlaced together (as described in Example 4). Then this air coved yarn are fed into core spun yarn machine and used as a core covered with cotton (As described in Example 8).

The fabric performance after normal finishing process and after thermal activating process is listed in Table 2. This fabric also have high stretch (55.8%), low growth (3.2%), good recovery (92.8%) and low shrinkage (6.68%) after normal finishing process. After thermal activation process at 182° C. for 45 seconds, the fabric stretch, growth, recovery and shrinkage become 9.0%, 1.3%, 81.9% and 0% in weft direction respectively. This fabric also has shaping function.

Example 13: Stretch Woven with Air Jet Covered Yarn

The warp yarn is the same as Example 11 and 12. The weft yarn is air jet covered yarn with three type of fibers: 140D/144f polyester filament, 75D/36f low-melting bi-component yarn and 70D LYCRA® fiber. Three yarns are intermingled together through an air jet nozzle as described in Example 7. The fabric stretch, growth, recovery and shrinkage are 51.2%, 3.5%, 91.5% and 11.08% in weft direction after normal finishing process. The thermal activating process is conducted in pressing machine with 160° C. degree, 60 seconds and 2 bar press. After such process, the fabric stretch level (28.7%) dramatically reduced but the fabric recovery power (83.4%) does not change much.

This example shows that the air jet covered yarn with low-melting fiber is also can have shaping effect. The fabric can be stabilized in lower temperature than elastic fiber heatset temperature.

Example 14: Stretch Denim with Two Elastic Fibers

This sample had the same fabric structure as in example 13. The only difference was the use of 150D LYCRA® T400® fiber in weft. The weft yarn contains double elastic fibers: 40D LYCRA® fiber with 3.5× draft and 150D LYCRA® T400® fibers. Three types of fibers are intermingled together through an air nozzle, as explained in Example 6. Table 2 summarizes the fabric test results. It is clearly shows that this sample has good stretch (44.7%) and lower fabric growth level (3.0%) and extremely good in fabric recovery (91.6%). Therefore, by using two different elastic fibers within the same yarn, the covered yarn and the fabric can achieve different characters.

This fabric containing two elastic fibers also can be made with shaping function as data show in table 2 before and after thermal activating process. After thermal activating process, the fabric stretch level reduce to 23.2%, while growth and recovery are 3.2% and 82.8%.

Example 15: Stretch Fabric with Co-Insertion Weft

This sample had the same warp yarn as above examples. A different weaving technology is use for weft yarn. 14s cotton with 40D LYCRA® fiber core spun yarn and 75D low-melting bi-component yarn are co-insertion into weft at the same time during weaving. These two yarns are separated and no connected together before weaving. They are inserted into a same weaving shed from different package. The fabric stretch performance is shown in table 2 before and after thermal activating.

It is interesting to find that Low-melting fiber still can provide bounding and shaping function under this structure, even though low-melting yarn doesn't have contact points with elastic yarns which covered by cotton.

Example 16: Stretch Fabric with Double Elastic Yarn

In this example, the weft yarn is co-insertion yarn: 75D low-melt bi-component yarn plus an air jet covered yarn of 150D LYCRA® T400@ fiber and 40D LYCRA® spandex fiber (the yarn described in Example 6). Other fabric structure is the same as above denim examples. The fabric has very high stretch and powerful recovery force. After normal finishing process, the stretch, growth, recovery and shrinkage in weft direction are: 45.1%, 2.7%, 92.5%, and 9.4% respectively. The fabric growth is only 2.7% which indicate the low-melt fiber would not affect the fabric recovery negatively.

Example 17: Stretch Fabric with Spandex and Elastic Polyolefin Fiber

The warp yarn was 7.0 Ne count and 8.4 Ne count mixed open end yarn. The warp yarn was indigo dyed before beaming. The weft yarn is 16Ne core spun yarn with 40D T162B Lycra® spandex and 40D polyolefin fiber in the core. The Lycra® fiber and was drafted 3.5× and fed into twist zone together polyolefin fiber during core spun covering process. Table 2 lists the fabric properties. The fabric made from such yarns exhibited good cotton hand, good stretch (45.5%), low growth (5.7%) and good recovery (84.3%). Fabric has no grin through. Elastic filaments can't be seen from both fabric surface and fabric back.

The fabric panel is thermal activated in a pressing machine in thigh zone of the leg of the jean. The heat condition is 160° C. for 1 minute with 2 bars pressure. After such process, the fabric stretch, growth and recovery become: 39.3%, 5.3% and 83.1% respectively. Therefore, we can see, the denim fabric stretch and growth reduced to maintain the fabrics dimension and shape. The jean in shaping zones could restrict the denim deformation, give higher compressions on the human body, and form shaping effect for pants, jeans and leggings by adding low melt fiber.

Example 18: Circular Knit Denim with Low-Melt Fiber

It is an innovative fabric. The fabric is a circular knit denim fabric with woven effects, containing two groups of yarns: effective yarn for surface and ground yarn for back. The effect yarn is two-ends of 30S cotton indigo dyed yarn. The ground yarn comprises 75D/36f low-melt bi-component yarn and 70D T162C LYCRA® spandex fiber.

The fabric is knit on Monarch Circular Knitting Machine Model F-SEC-U/ST electric Jacque machine, with 32 inch cylinder diameter, 28 gauge (needles per circumferential inch) and 2958 needles, and 48 yarn feed positions. The circular knit machine is operated at 16 revolutions per minute (rpm). The LYCRA® fiber feed tension is measured between the supply package and the roller guide with an Iro Memminger digital tension meter MPF40GIF, model number, MER10. The LYCRA® fiber feed tensions are maintained at 7 grams. The tension for low-melt fiber is around 8~9 grams. The tension for indigo yarn is about 6~7 grams. After normal finish process, the fabric stretch is 70% and 30.1% in wales and course direction with growth (8.9%× 5.2% in wale X course direction). The fabric surface has ½ twill and jersey loop base is plain single jersey. This knit fabric has woven look and performance, and suitable to be used for jean.

In some locations of this sample, a heat is added with pressure in pressing machine: 160° C. degree for 1 minute under 2 bar pressure. After such thermal activating process, the fabric stretch, growth and recovery become: warp direction, 20.5%, 2.9% and 82.6%; course direction, 33.55, 5.2% and 80.3%. The garment made from this fabric can have shaping effects. In critical areas, the fabric stretch can be reduced with high restrain force.

Example 19: Cotton Circular Knit Fabric with Low Melt Fiber

The circular knit fabric is a single jersey fabric with three fibers: 50S supima cotton, 40D T162C LYCRA® fiber and 75D/34f low-melt bi-component yarn. Three yarns are plated together into fabric and knit into single jersey. The content of elastic fiber and low melt fiber in fabric is 6.3% and 37.3% respectively. The fabric has good cotton touch and appearance and is a good fabric T-shirt, under wear and casual wear. Before being dyed into blue, the fabric is heatset at various temperatures. The stretch levels (machine direction×cross machine direction) of the fabric without heatset, heatset under 140° C., 150° C. and 160° C. are: 131%×99%, 116%×93%, 100%×89% and 45%×50%, respectively. The fabric weights after such processes are: 12.902 OZ/Y^2, 10.913 OZ/Y^2, 10.394 OZ/Y^2 and 7.952 OZ/Y^2.

From these results, we can see that when the fabric is treated around 160° C., the fabric is set well, and the fabric stretch level is dramatically reduced and have light weight.

It clearly demonstrates that the fabric comprising low-melt fiber can be heatset at much lower temperature used for heatset elastic fiber. The heatset temperature of T162C LYCRA® fiber is around 195° C.

Example 20: Polyester Circular Knit Fabric with Low-Melt Fiber

The circular knit fabric is a single jersey fabric with three fibers: 70d/72f textured polyester, 40D T162C LYCRA® fiber and 75D/34f low-melt bi-component yarn. Three yarns are plated together into fabric and knit into single jersey. The content of elastic fiber and low melt fiber in fabric is 7.8% and 46.1% respectively. The fabric is a good active wear and casual wear. Before being dyed into black by disperse dye, the fabric is heatset at various temperatures. The stretch levels (machine direction×cross machine direction) of the fabric without heatset, heatset under 140° C., 150° C. and 160° C. are: 140%×117%, 125%×109%, 121%×106% and 55%×62%, respectively. The fabric weights after such processes are: 12.323 OZ/Y^2, 11.816 OZ/Y^2, 10.688 OZ/Y^2 and 8.333 OZ/Y^2.

As the heatset temperature increase, the fabric stretch decrease. When the fabric is treated around 160° C., the fabric is set well, and the fabric stretch level is remarkably reduced. It indicates that the fabric comprising low-melt fiber can be heatset at much lower temperature used for heatset elastic fiber. When the heat is applied in predetermined areas, the fabric has significant low stretch level in these areas.

Example 21: Seamless Fabric Containing Low Melt Fiber

This fabric is made in Santoni seamless machine. The fabric is not heatset. This knit fabric is a jersey twill fabric with three fibers: 50S cotton, 30D T162C LYCRA® fiber and 75D/34f low-melt bi-component yarn. Cotton yarn forms the fabric face, and the elastic yarn and low-melt yarn are plated together to form fabric base. The content of elastic fiber and low melt fiber in fabric is 6.3% and 34.2% respectively.

The example fabric is made by circular knitting using a SMA-8-TOP seamless, 28 inch body size, knitting machine from SANTONI (from GRUPPO LONATI, Italy) (hereinafter, "the SANTONI knitting machine"). In making the innovative fabrics, a combination of different knitting constructions using various types of yarns was used. The machine has 8 yarn feed positions. It operated at 70 revolutions per minute (rpm). The spandex feed tension is measured with an BTSR® digital tension meter, model number, KTF-100HP. The spandex feed tensions are maintained at 1 gram for each 10 denier spandex. The tension device for no-elastomeric elastic yarn and hard yarn is IRO Memminger with model ROJ Tricot.

The fabric stretch is 100%×79% in wale and course direction. In order to obtain shaping effect, the garment is treated with heat in front of belly position at 155° C. for 45 seconds under 2 bars pressure. After such thermal activating process, the fabric stretch level becomes 56%×43% in wale and course direction. The fabric offers holding and restraining function in these positions.

Example 22: Seamless Fabric Containing Low Melt Fiber

This fabric is made in Santoni seamless machine. This knit fabric is a jersey fabric with woven fabric look, consisting three fibers: 60S cotton, 20D T162C LYCRA® fiber and 75D/34f low-melt bi-component yarn. Three yarns are plated together into fabric and knit into jersey. The content of elastic fiber and low melt fiber in fabric is 4.8% and 38.9% respectively. The fabric stretch is 118%×99% in wale and course direction. In order to obtain shaping effect, the garment is treated with heat in two sides of waist areas at 150° C. for 45 seconds under 2 bars pressure. After such thermal activating process, the fabric stretch level becomes 76%×63% in wale and course direction. The fabric has higher holding force in waist area for better slimming shaping effects.

Example 23: Socks

The sock top is made with three kinds of fiber: rigid yarn, 30S 927W COOLMAX® fiber spun yarn; the elastic yarn, 120D T902C double covered elastic composite yarn; the low-melt yarn: 75d/36f low melt bi-component yarn. The elastic yarn and low-melt yarn is plated in with 1/1 laid—in structure. The sock foot is also made with three types of yarn: rigid 30S 927W COOLMAX® fiber spun yarn, plating with elastic 18D T178C LYCRA® fiber/44D/34f Nylon 6 air covered yarn and 75D/36F low-melt bi-component yarn in plain jersey structure. The sock is knitted with 200 needles.

The sock has stretch (machine direction %×cross machine direction %) in top and in foot area is 112%×232% and 127.5%×184.0% after finishing. Some parts of the sock are treated with heat under press machine with 150° C. for 60 seconds. The stretch level becomes 92%×200% and 94%×97% after heat treatment in top and foot area, respectively. Therefore, locally pressurized zones can be added into socks with this innovative method. The sock has a non-slip effect which can more reliably have high friction coefficients in these treated zones than other areas.

Example 24: Pantyhose

Pantyhose is made by 15D LYCRA® fiber with 10/7 nylon single covered yarn plus 75D/36F low-melt bi-component yarn. The knit structure is plain knit. In the middle of leg part, the fabric is pressed with 150° C. for 45 seconds. The stretch level in this area before thermal activating process is 139%×137% in machine and cross machine direction. After heat pressing treatment, the fabric stretch is 94%×97% in machine and cross machine direction. Also, we find that in heat treated area, the spandex has better anti-run and anti-laddering performance in cutting hole. The melt and fused low-melting polymer binds with spandex together and prevent it run.

What is claimed is:

1. An elastic fabric with easy set and shape enhance property, said elastic fabric comprising nonelastic fibers, elastic fibers, and low-melt fibers; wherein
   i) the low-melt fiber comprises a low melt polymer selected from the group consisting of polyester, polyamide, polyolefin and polypropylene;
   ii) the melting temperature of the low-melt fiber is between 60° C. to 200° C.; and
   iii) the content of low-melt fibers is no less than 0.5% and no higher than 55% of the fabric weight; and
   wherein said fabric is a woven fabric comprising dual core spun yarn with said nonelastic fiber as a sheath and said elastic fiber and said low-melt fiber as a core.

2. The fabric of claim 1, wherein said low-melt fiber is a filament from 10 denier to 450 denier.

3. The fabric of claim 1, wherein said low-melt fiber is a staple fiber with denier from 0.5 denier to 10 denier.

4. The fabric of claim 1, wherein said low-melt fiber is monopolymer.

5. The fabric of claim 1, wherein said low-melt fiber is bi-component.

6. The fabric of claim 1, wherein said low-melt fiber is bi-component filament with sheath core structure, wherein the sheath comprises low-melt polymer.

7. The fabric in claim 1, where the melting temperature of low-melt fiber is 100° C. to 185° C.

8. The fabric of claim 1, wherein said elastic fiber is spandex elastic fiber.

9. The fabric of claim 1, wherein said elastic fiber is polyester bi-component elastic fiber.

10. The fabric of claim 1, wherein said fabric is heatset at the temperature lower than 180° C.

11. The fabric of claim 1, wherein said fabric has a construction selected from the group consisting of woven, circular knit, warp knit, sock and seamless structure.

12. The fabric of claim 1, wherein said fabric is a hosiery comprised of said nonelastic fiber, said elastic fiber and said low-melt fiber.

13. The fabric of claim 1, wherein said fabric exhibits durability, abrasion resistance, wrinkle resistance, anti-elastane slippage, anti-laddering and running, and anti-curving.

14. A method of making fabric of claim 1, comprising: adding low-melt fiber during yarn spinning, or yarn covering, or fabric formation process; optionally dyeing or finishing the fabric or garment; and optionally thermal fusing said fabric before, during or after garment making in predetermined locations.

15. The method of claim 14, wherein the thermal activating process is conducted on the fabric or fabric panel before garment making.

16. The method of claim 14, wherein the thermal fusing temperature no lower than 60° C. but no higher than 200° c.

17. The method of claim 14, wherein the method of applying said thermal activating process is selected from the group consisting of heat pressing, laminating, oven, tent frame, ironing, stamping, molding, laser, ultrasonic and the combination thereof.

* * * * *